(12) United States Patent
Toma et al.

(10) Patent No.: US 8,514,938 B2
(45) Date of Patent: Aug. 20, 2013

(54) PICTURE CODING APPARATUS FOR A STILL PICTURE SEQUENCE AND PICTURE DECODING APPARATUS FOR A STILL PICTURE SEQUENCE

(75) Inventors: Tadamasa Toma, Osaka (JP); Tomoyuki Okada, Nara (JP); Sam Liu, Mountain View, CA (US)

(73) Assignees: Hewlett-Packard Development Company L.P., Houston, TX (US); Panasonic Corporation, Osaka (JP)

( * ) Notice: Subject to any disclaimer, the term of this patent is extended or adjusted under 35 U.S.C. 154(b) by 1207 days.

(21) Appl. No.: 11/576,085

(22) PCT Filed: Oct. 5, 2005

(86) PCT No.: PCT/JP2005/018735
§ 371 (c)(1),
(2), (4) Date: Mar. 27, 2007

(87) PCT Pub. No.: WO2006/038716
PCT Pub. Date: Apr. 13, 2006

(65) Prior Publication Data
US 2008/0075168 A1    Mar. 27, 2008

Related U.S. Application Data

(60) Provisional application No. 60/616,203, filed on Oct. 7, 2004.

(51) Int. Cl.
*H04N 11/02* (2006.01)
(52) U.S. Cl.
USPC ............. 375/240.15; 375/240.25; 375/240.26
(58) Field of Classification Search
USPC .................. 375/240, 240.01, 240.13, 240.21
See application file for complete search history.

(56) References Cited

U.S. PATENT DOCUMENTS 4,891,643 A * 1/1990 Mitchell et al. ............... 341/107
5,461,420 A   10/1995 Yonemitsu et al.
(Continued)

FOREIGN PATENT DOCUMENTS

EP    0588668      3/1994
EP    1589767      10/2005
(Continued)

OTHER PUBLICATIONS

"Proposed SMPTE Standard for Television: VC-1 Compressed Video Bitstream Format and Decoding Process," Final Committee Draft 1, Revision 6, Jul. 13, 2005.

(Continued)

*Primary Examiner* — David Czekaj
*Assistant Examiner* — Leron Beck
(74) *Attorney, Agent, or Firm* — Greenblum & Bernstein, P.L.C.

(57) ABSTRACT

A picture coding apparatus reduces a load in decoding. The picture coding apparatus codes each picture according to a picture type of the picture. The picture types include at least an I picture, a P picture, a B picture, and a skipped picture. A first coder is configured to code first supplementary information, including coded pictures and indicating respective picture types of the coded pictures, in a decoding order of the coded pictures. A second coder is configured to code second supplementary information, indicating respective pieces of picture structure information of the coded pictures, in the decoding order. A writer is configured to write, at a position prior to a starting picture, the first supplementary information coded by said first coder and the second supplementary information coded by said second coder.

5 Claims, 20 Drawing Sheets

(56) References Cited

U.S. PATENT DOCUMENTS

| | | | |
|---|---|---|---|
| 5,768,469 A | 6/1998 | Yagasaki et al. | |
| 5,835,672 A | 11/1998 | Yagasaki et al. | |
| 6,002,834 A * | 12/1999 | Hirabayashi et al. | 386/248 |
| 6,529,550 B2 * | 3/2003 | Tahara et al. | 375/240 |
| 6,731,859 B1 * | 5/2004 | Honjo | 386/344 |
| 6,819,714 B2 | 11/2004 | Yamada et al. | |
| 6,956,971 B1 * | 10/2005 | Cho et al. | 382/236 |
| 7,437,009 B2 | 10/2008 | Uchibayashi et al. | |
| 7,756,394 B1 * | 7/2010 | Willis et al. | 386/352 |
| 7,792,190 B2 * | 9/2010 | Watanabe et al. | 375/240.03 |
| 7,809,060 B2 | 10/2010 | Toma et al. | |
| 7,843,994 B2 * | 11/2010 | Toma et al. | 375/240.12 |
| 2001/0046263 A1 | 11/2001 | Yamada et al. | |
| 2003/0053538 A1 | 3/2003 | Katsavounidis et al. | |
| 2003/0133169 A1 | 7/2003 | Uchibayashi et al. | |
| 2005/0147375 A1 | 7/2005 | Kadono | |
| 2005/0152457 A1 | 7/2005 | Regunathan et al. | |
| 2008/0117988 A1 | 5/2008 | Toma et al. | |
| 2008/0118218 A1 | 5/2008 | Toma et al. | |
| 2008/0118224 A1 | 5/2008 | Toma et al. | |
| 2008/0131079 A1 | 6/2008 | Toma et al. | |
| 2008/0219393 A1 | 9/2008 | Toma et al. | |
| 2009/0010556 A1 | 1/2009 | Uchibayashi et al. | |

FOREIGN PATENT DOCUMENTS

| | | |
|---|---|---|
| JP | 6-197273 | 7/1994 |
| JP | 2002-010271 | 1/2002 |
| JP | 2003-284077 | 10/2003 |
| JP | 2004-282703 | 10/2004 |
| JP | 2007-535187 | 11/2007 |
| WO | 2004/066635 | 8/2004 |
| WO | 2005/106875 | 11/2005 |

OTHER PUBLICATIONS

U.S. Appl. No. 11/721,479 to Toma et al, filed Jun. 12, 2007.

Japan Office action, mail date is May 10, 2011.

* cited by examiner

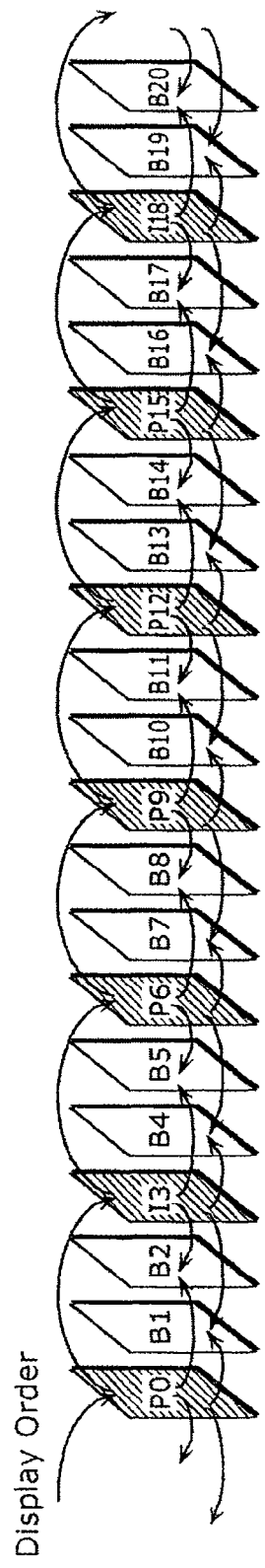
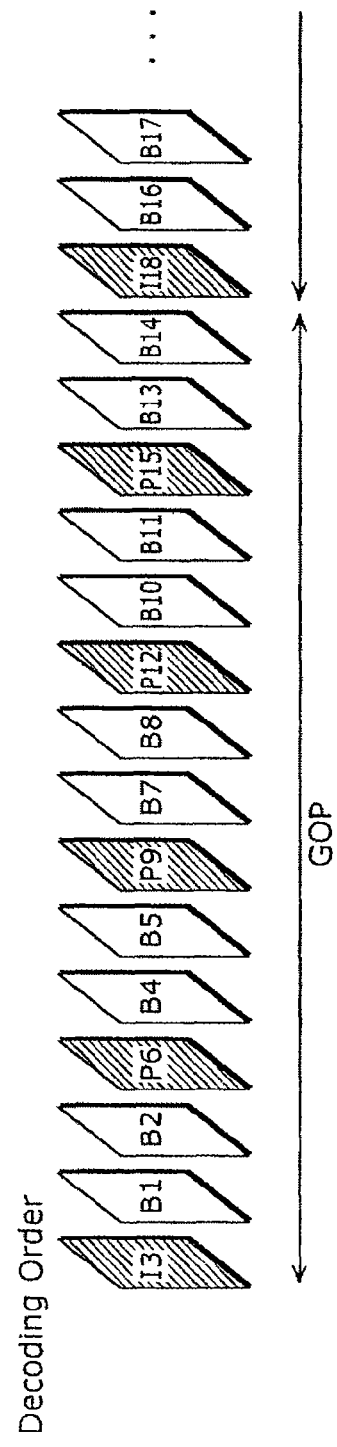
FIG. 2A PRIOR ART
Display Order
FIG. 2B PRIOR ART
Decoding Order

FIG. 9A

```
RAU map {
   num_pic_in_RAU;
   for (i=0; i < num_pic_in_RAU; i++) {
      frame_field_flag;
      pic_type;
   }
}
```
— MI

FIG. 9B

```
RAU map {
   num_frame_in_RAU;
   for (i=0; i < num_frame_in_RAU; i++) {
      field_coding_flag;
      if (field_coding_flag) field_type_mode;
      else picture_type;
   }
}
```
— MI

FIG. 9C

```
RAU map
   motionless_flag;
   if (motionless_flag ==1) {
      start_pic_num;
      end_pic_num;
   }
}
```
— MI

FIG. 9D

```
EPS_structure_map () {
      number_of_pictures_in_EPS;
      for (i=0; i < number_of_pictures_in_EPS; i++) {
         // decoding order
               stuffing_bits    ;
               picture_structure;
               picture_type     ;
      }
}
```
— MI

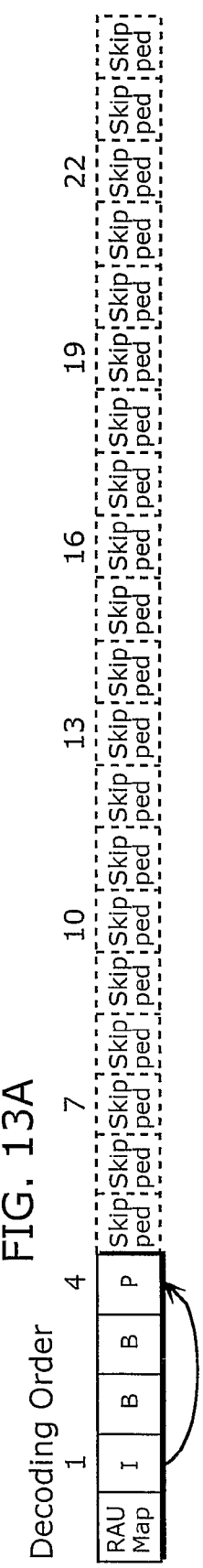

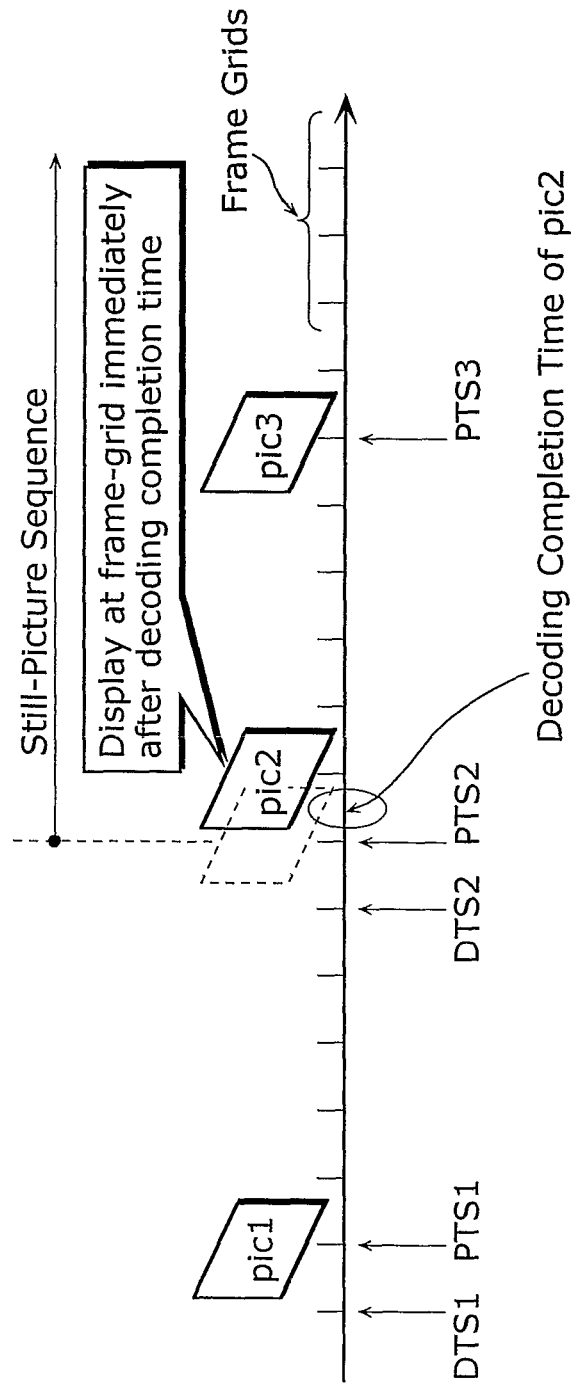

Decoding Order

Display Order

PICTURE CODING APPARATUS FOR A STILL PICTURE SEQUENCE AND PICTURE DECODING APPARATUS FOR A STILL PICTURE SEQUENCE

CROSS-REFERENCE TO RELATED APPLICATIONS

This application is a National Stage Application of International Application No. PCT/JP2005/018735, filed Oct. 5, 2005, and claims the benefit of U.S. Provisional Application No. 60/616,203, filed Oct. 7, 2004.

BACKGROUND OF THE INVENTION (1) Field of the Invention

The present invention relates to a picture coding apparatus which codes a moving picture, a stream which is generated by an image coding method using the picture coding apparatus, and a picture decoding apparatus which decodes the stream.

(2) Description of the Related Art

Recently, with the arrival of the age of multimedia which integrally handles audio, video and pixel values, existing information media, for example, newspaper, journal, Television, radio and telephone, and other means through which information is conveyed to people, has come under the scope of multimedia. In general, multimedia refers to a representation in which not only characters but also graphic symbols, audio and especially pictures and the like are related to each other. However, in order to include the aforementioned existing information media in the scope of multimedia, it appears as a prerequisite to represent such information in digital form.

However, when estimating the amount of information contained in each of the aforementioned information media in digital form, the information amount per character requires 1 to 2 bytes whereas audio requires more than 64 Kbits per second (telephone quality), and a moving picture requires more than 100 Mbits per second (present television reception quality). Therefore, it is not realistic to handle the vast amount of information directly in digital form via the information media mentioned above. For example, a videophone has already been put into practical use via Integrated Services Digital Network (ISDN) with a transmission rate of 64 Kbits/sec to 1.5 Mbits/sec, however, it is impossible to transmit a picture captured by a TV camera.

This therefore requires information compression techniques, and for instance, in the case of a videophone, video compression techniques compliant with H.261 and H.263 Standards recommended by International Telecommunication Union-Telecommunication Standardization Sector (ITU-T) are employed. According to the information compression techniques compliant with the MPEG-1 standard, picture information as well as audio information can be stored in an ordinary music CD (Compact Disc).

Here, Moving Picture Experts Group (MPEG) is an international standard for a compression of moving picture signals and the MPEG-1 is a standard that compresses video signals down to 1.5 Mbit/s, namely, to compress the information included in TV signals approximately down to a hundredth. The quality targeted by the MPEG-1 standard was medium quality so as to realize a transmission rate primarily of about 1.5 Mbits/sec, therefore, MPEG-2, standardized with the view to meeting the requirements of even higher quality picture, realizes a TV broadcast quality for transmitting moving picture signals at a transmission rate of 2 to 15 Mbits/sec.

In the present circumstances, a working group (ISO/IEC JTC1/SC29/WG11) previously in charge of the standardization of the MPEG-1 and the MPEG-2 has further standardized MPEG-4 which achieves a compression rate superior to the one achieved by the MPEG-1 and the MPEG-2, allows coding/decoding operations on a per-object basis and realizes a new function required by the age of multi media. At first, in the process of the standardization of the MPEG-4, the aim was to standardize a low bit rate coding, however, the aim is presently extended to a more versatile coding including a high bit rate coding for interlaced pictures and others. Moreover, the ISO/IEC and the ITU-T have jointly developed, as a next-generation image coding method, a standardization of MPEG-4 Advanced Video Coding (AVC) with a higher compression rate, and currently Society of Motion Picture and Television Engineers (SMPTE) attempts to standardize a VC-1 (Proposed SMPTE Standard for Television: VC-1 Compressed Video Bitstream Format and Decoding Process, Final Committee Draft 1 Revision 6, 2005 Jul. 13). A target of the VC-1 is to extend a coding tool and the like, based on the methods of the MPEG-2 and MPEG-4 standards. The VC-1 is expected to be used for next-generation optical disk peripheral devices, such as a Blu-ray disc (BD) and a High Definition (HD) DVD.

In general, in coding of a moving picture, compression of information volume is performed by eliminating redundancy both in spatial and temporal directions. Therefore, an inter-picture prediction coding, which aims at reducing the temporal redundancy, estimates a motion and generates a predicted picture on a block-by-block basis with reference to prior and subsequent pictures, and then codes a differential value between the obtained predicted picture and a current picture to be coded. Here, "picture" is a term to represent a single screen and it represents a frame when used for a progressive picture whereas it represents a frame or fields when used for an interlaced picture. The interlaced picture here is a picture in which a single frame consists of two fields respectively having different time. For coding and decoding an interlaced picture, three ways are possible: processing a single frame either as a frame, as two fields or as a frame/field structure depending on a block in the frame.

A picture to which an intra-picture prediction coding is performed without reference pictures is referred to as an "I-picture". A picture to which the inter-picture prediction coding is performed with reference to a single picture is referred to as a "P-picture". A picture to which the inter-picture prediction coding is performed by referring simultaneously to two pictures is referred to as a "B-picture". The B-picture can refer to two pictures, arbitrarily selected from the pictures whose display time is either forward or backward to that of a current picture to be coded, as an arbitrary combination. However, the reference pictures need to be already coded or decoded as a condition to code or decode these I-picture, P-picture, and B-picture.

FIGS. 1A and 1B are diagrams showing a structure of the conventional MPEG-2 stream. As shown in FIG. 1B, the stream according to the MPEG-2 standard has a layered system. The stream is made up of a plurality of Group of Pictures (GOP). It is possible to edit a moving picture and to perform random access on it by using the GOP as a basic unit used in coding processing. This means that a starting picture in the GOP is a random access point. The GOP consists of a plurality of pictures, each being I-picture, P-picture and B-picture. The stream, GOP and picture respectively include a synchronous signal (sync) indicating a boundary between respective units and a header that is data commonly included in the respective units.

FIGS. 2A and 2B are examples of a prediction structure of pictures according to the MPEG-2 standard. Shaded pictures in FIG. 2A are reference pictures which are referred to predict other pictures. As shown in FIG. 2A, in the MPEG-2 standard, P-picture (picture P0, P6, P9, P12, or P15) can be predicted from one picture, either I-picture or P-picture, whose display time immediately precedes that of the P-picture. B-picture (picture B1, B2, B4, B5, B7, B8, B10, B11, B13, B14, B16, B17, B19, or B20) can be predicted from one picture whose display time immediately precedes the B-picture or one picture whose display time immediately follows the B-picture, both of which can be either I-picture or P-picture. The positions of the B-pictures are arranged in the stream, either immediately subsequent to I-picture or P-picture. Therefore, at the time of performing random access, all the pictures subsequent to I-picture can be decoded and displayed, when decoding starts from I-picture. Regarding a structure of the GOP, the pictures from I3 to B14 can be considered as one GOP, as shown in FIG. 2B for example.

FIG. 3 is a diagram showing a structure of a stream according to the VC-1. The stream according to the VC-1 also has the same structure as described for the MPEG-2 standard. However, a random access point is referred to as an "entry point" which is added with an entry point header (Entry Point HDR). Data from the entry point to a next entry point is a random access unit (RAU), which is equivalent to one GOP according to the MPEG-2 standard. Hereafter, the RAU according to the VC-1 is referred to as a "random access point (RAU)". Note that the RAU can store user data regarding pictures in the RAU (user data at Entry-point level), and the RAU is arranged immediately subsequent to the entry point header.

Here, types of pictures according to the VC-1 are described. In the VC-1, the I-picture, P-picture, and B-picture are also defined. These I-picture, P-picture, and B-picture have the same prediction structure as described for the MPEG-2 standard. In the VC-1, in addition to the above three types of picture, there are two more defined types, which are Skipped picture and BI-picture. The Skipped picture is a picture which does not include any pixel data, and treated as a P-picture having the same pixel data of a prior reference picture in decoding order. For example, in examples of (1) and (2), a picture S5 is regarded the same picture as a picture P3, so that the same operation of decoding the stream is performed in both (1) and (2).

(1) Display order: Picture I0, Picture B2, Picture P1, Picture B4, Picture P3, Picture B6, Picture S5 (Note that the picture represented by a symbol including I is an I-picture, the picture represented by a symbol including P is a P-picture, the picture represented by a symbol including B is a B-picture, and the picture represented by a symbol including S is a Skipped picture. For example, the picture S6 is a Skipped picture. The numerals attached to the symbols of the pictures represent decoding order.)

(2) Display order: Picture I0, Picture B2, Picture P1, Picture B4, Picture P3, Picture B6, Picture P5 (P5 has the same pixel data as P3.)

The Skipped picture is especially useful when pictures are still. For example, in a case where the pictures are still in the middle of the RAU, Skipped pictures are used where the pictures are still, for example, where there are picture I0, picture P1, picture P2, picture P3, picture S4, picture S5, picture S6 . . . , in order to reduce an amount of data to be coded.

Furthermore, BI-picture is a picture having characteristics of the B-picture and I-picture. More specifically, the BI-picture has the B-picture characteristics in which decoding order is different from display order, and the picture is not a reference picture for other pictures. In addition, the BI-picture has the I-picture characteristics in which all macroblocks are applied with an intra-picture coding and the picture is not predicted from any other pictures.

Next, a method for distinguishing the I-picture, P-picture, B-picture, Skipped picture, and BI-pictures is described. Basically, the types of pictures can be distinguished based on the picture types included in a picture layer in a stream. However, the picture types indicated by the picture layer are defined as following, depending on profiles.

For example, in a simple profile, picture types are indicated as I-picture and P-picture. In a main profile, picture types are indicated as I-picture, P-picture, and B- or BI-picture. In an advanced profile, picture types are indicated as I-picture, P-picture, B-picture, BI-picture, and Skipped picture.

Here, in both of the simple profile and the main profile, it is impossible to distinguish the Skipped picture by using the picture types in the picture layer, so that, in a case where an arbitrary picture has a size of one or less byte, the picture is defined as the Skipped picture. Furthermore, in the main profile, one picture type is defined to represent B-picture or BI-picture, so that it is impossible to distinguish B-picture from BI-picture, based on the picture type.

FIG. 4 is a block diagram showing a picture coding apparatus for realizing the conventional image coding method.

A picture coding apparatus 800 performs compressed coding, variable length coding, and the like, for an inputted picture signal Vin, thereby transforming the picture signal Vin into a bitstream (stream) Str to be outputted. The picture coding apparatus 800 is comprised of a motion estimation unit 801, a motion compensation unit 802, a subtractor 803, an orthogonal transformation unit 804, a quantization unit 805, an inverse quantization unit 806, an inverse orthogonal transformation unit 807, an adder 808, a picture memory 809, a switch 810, a variable length coding unit 811, and a prediction structure determination unit 812.

The picture signal Vin is inputted into the subtractor 803 and the motion estimation unit 801. The subtractor 803 calculates a differential between the inputted picture signal Vin and a predicted picture, and outputs the differential to the orthogonal transformation unit 804. The orthogonal transformation unit 804 transforms the differential into a frequency coefficient, and outputs the frequency coefficient into the quantization unit 805. The quantization unit 805 quantizes the inputted frequency coefficient, and outputs the resulting quantization value Qc into the variable length coding unit 811.

The inverse quantization unit 806 inversely quantizes the quantization value Qc in order to restore the original frequency coefficient, and outputs the resulting frequency coefficient to the inverse orthogonal transformation unit 807. The inverse orthogonal transformation unit 807 performs inverse-frequency transformation on the frequency coefficient to be transformed into a pixel differential, and outputs the pixel differential to the adder 808. The adder 808 adds the pixel differential with a predicted picture which is outputted from the motion compensation unit 802, and generates a decoded picture. The switch 810 is On when the decoded picture is instructed to be stored, and the decoded picture is stored into the picture memory 809.

On the other hand, the motion estimation unit 801, in which the picture signal Vin is inputted in units of macroblocks, searches the decoded pictures (reference pictures) which are stored in the picture memory 809, detects an image having the most similar image to a macroblock indicated by the picture signal Vin, and determines a motion vector MV for indicating a location of the image.

The motion compensation unit 802, by using the determined motion vector and the like, retrieves the most suitable image for a predicted picture, from the decoded picture stored in the picture memory 809.

A prediction structure determination unit 812 determines, based on a RAU start picture Uin, that a picture to be coded is at a RAU start location, then instructs, using a picture type Pt, the motion estimation unit 801 and the motion compensation unit 802 to code (inter-picture coding) the picture as a special randomly-accessible picture, and further instructs the variable length coding unit 811 to code the picture type Pt.

The variable length coding unit 811 performs variable length coding on the quantization value Qc, the picture type Pt, and the motion vector MV in order to generate a stream Str.

FIG. 5 is a block diagram showing a picture decoding apparatus 900 for realizing the conventional image decoding method. The reference numerals in FIG. 4 are assigned to identical units in FIG. 5, and the those units operate in the same manner as described for the picture coding apparatus for realizing the conventional image coding method in FIG. 4, so that the details of those units are not described herein below.

The variable length decoding unit 901 decodes the stream Str, and outputs the quantization value Qc, a reference picture specification information Ind, the picture type Pt, the motion vector MV, and the like. The picture memory 809 obtains the movement vector MV, the motion compensation unit 802 obtains the picture type Pt, the movement vector MV, and the reference picture specification information Ind, and the inverse quantization unit 806 obtains the quantization value Qc. The decoding is performed by the picture memory 809, the motion compensation unit 802, and the inverse quantization unit 806, the inverse orthogonal transformation unit 807, and the adder 808. The operation of the decoding has been described with reference to the block diagram of FIG. 4 showing the picture coding apparatus 800 for realizing the conventional coding method.

A buffer memory 902 is a memory for storing a decoded picture Vout which is outputted from the adder 808, and a display unit 903 obtains the decoded picture Vout from the buffer memory 902 and displays a picture according to the decoded picture Vout. Note that the buffer memory 809 and the picture memory 902 can share the same memory.

FIG. 6 is a flowchart showing decoding during special play-back, such as high-speed play-back, performed by the conventional picture decoding apparatus 900. Firstly, the conventional picture decoding apparatus 900 detects, from the stream Str, a header of a picture to be decoded at Step S1001. Then at Step 1002, the conventional picture decoding apparatus 900 examines, based on a picture type in the header included in the picture layer, whether or not the starting picture needs to be decoded. At Step S1003, the conventional picture decoding apparatus 900 determines whether or not the picture is examined to be decoded at Step 1002, and if the decoding needs to be decoded, then the processing proceeds to Step S1004, while if the picture does not need to be decoded, then the processing proceeds to Step S1005. Finally, at Step S1005, the conventional picture decoding apparatus 900 determines whether or not the processing completes even for a last picture to be play-backed, such as a last picture in a RAU or a stream, and if there are still pictures to be processed, the processing repeats the steps from Step S1001 to S1005, and if the last picture is processed, the processing completes.

However, in the above conventional picture coding apparatus 800 and picture decoding apparatus 900, there is a problem of a large amount of processing load, during coding the stream Str which includes Skipped pictures, and especially during the special play-back such as high-speed play-back.

FIG. 7 is an explanatory diagram showing the problem in the above conventional picture coding apparatus 800 and picture decoding apparatus 900.

In (a) of FIG. 7, a structure of the conventional RAU including the Skipped pictures is shown. The RAU is comprised of twenty-four pictures in which the images are still in the fourth and following pictures in decoding order, so that the fifth and later pictures are all Skipped pictures. When such a RAU is play-backed at triple speed, the conventional picture decoding apparatus 900 attempts to decode the 1st, 4th, 7th, 10th, 13th, 16th, 19th and 22nd pictures, sequentially to be play-backed. However, pictures to be practically decoded are only first I-picture and the fourth P-picture as shown in (c) of FIG. 7.

This means that, in a RAU in the conventional stream Str, the picture decoding apparatus 900 cannot determine whether or not the pictures are to be decoded, unless a head of each picture (picture layer) is searched to obtain a picture type, since each picture layer includes a picture type of the picture. Therefore, as shown in (b) of FIG. 7, the picture decoding apparatus 900 needs to analyze the 7th, 10th, 13th, 16th, 19th and 22nd Skipped pictures to obtain the picture types.

As described above, for the high-speed play-back of the conventional RAU, the conventional picture coding apparatus and picture decoding apparatus need to analyze even pictures which do not need to be decoded, which eventually results in a large amount of data for decoding.

Thus, the present invention addresses the above problems and an object of the present invention is to provide a picture coding apparatus and a picture decoding apparatus which can reduce load in decoding.

SUMMARY OF THE INVENTION

In order to solve the above problems, the present invention provides a picture coding apparatus which codes a picture, the picture coding apparatus including: an coding unit operable to code each picture according to a picture type of the picture; a map generation unit operable to generate a map which indicates a still picture sequence in a random access unit that includes a plurality of coded pictures; and a writing unit operable to write, into the random access unit, the map which is generated by the map generation unit.

Thereby the map is stored in the random access unit, so that the picture decoding apparatus can easily specify, from the map, the still picture sequence in the in random access unit. As a result, the picture decoding apparatus does not need to determine whether or not the picture is a Skipped picture, by analyzing a plurality of the picture layers one by one which are included in the random access units as in the conventional method, so that it is possible to reduce the load in decoding.

Further, the writing unit may be operable to write the map at a position which is prior to a starting picture in the random access unit.

Thereby the picture decoding apparatus obtains the random access unit from the starting of the random access unit, thereby enabling to easily and speedily detect the map, so that it is possible to reduce the load in decoding.

Still further, the map generation unit may be operable to generate the map which indicates the picture type of each picture which is included in the random access unit. For example, the picture type may indicate whether or not a current picture is a Skipped picture which is to be displayed with an image of a reference picture that is positioned immediately prior to the Skipped picture in decoding order.

Thereby the picture decoding apparatus can specify as the still picture sequence, by using a picture type of each picture which is indicated in the map, a range in which a plurality of Skipped pictures follow after an I-picture or P-picture.

Still further, the map generation unit may be operable to generate the map which indicates a starting picture and a last picture in the still picture sequence.

Thereby the picture decoding apparatus can easily specify the still picture sequence, according to the starting and last pictures which are indicated in the map.

Here, in order to achieve the above object, the present invention provides a picture decoding apparatus which decodes a random access unit that includes a plurality of coded pictures, the picture decoding apparatus includes: a detection unit operable to detect, from the random access unit, a map which indicates a still picture sequence in the random access unit; a selection unit operable to select a picture to be decoded, from the coded pictures in the random access unit, based on the still picture sequence which is indicated by the map detected by the detection unit; and a decoding unit operable to decode the picture which is selected by the selection unit.

Thereby the picture to be decoded is previously selected based on the still picture sequence, prior to decode the picture, so that it is not necessary, as in the conventional method, to determine whether or not the picture is a Skipped picture, by analyzing a plurality of picture layers one by one which are included in the random access unit while decoding, which can reduce the load in decoding.

Moreover, in order to achieve the object, the present invention provides a coded picture signal which includes a plurality of coded pictures for each random access unit, the image coding signal comprising a map indicating a still picture sequence in random access unit for each random access unit.

Thereby the map is stored in the random access unit, so that the picture decoding apparatus can easily specify, from the map, the still picture sequence in the pictures in the random access unit. As a result, the picture decoding apparatus does not need to determine whether or not the picture is a Skipped picture, by analyzing the plurality of the picture layers one by one which are included in the random access unit, as in the conventional method, so that it is possible to reduce the load in decoding.

Furthermore, the map may be stored at a position prior to any pictures which are included in the random access unit.

Thereby the picture decoding apparatus obtains the random access units from the beginning of the random access unit, thereby enabling to easily and speedily detect the random access units, so that it is possible to reduce the load in decoding.

Note that the present invention can be realized not only as the above described picture coding apparatus, picture decoding apparatus, and image coding signal, but also as an image coding method, an image decoding method, a program, a storage medium which stores the program, and an integrated circuit which includes the above devices.

BRIEF DESCRIPTION OF THE DRAWINGS

FIGS. 2A and 2B are diagrams showing examples of a prediction structure between pictures used in the MPEG 2 standard.

FIG. 9A is a diagram showing an example of a syntax of a RAU map MI.

FIG. 9B is a diagram showing another example of the syntax of the RAU map MI.

FIG. 9C is a diagram showing still another example of the syntax of the RAU map MI.

FIG. 9D is a diagram showing still further example of the syntax of the RAU map MI.

FIG. 13A is a diagram showing a RAU which is play-backed at a high speed by the picture decoding apparatus according to the first embodiment of the present invention.

FIG. 13B is a diagram showing a RAU map MI according to FIG. 13A.

FIG. 14 is an explanatory diagram showing a play-back method which is performed by a picture decoding apparatus according to a variation of the first embodiment.

DESCRIPTION OF THE PREFERRED EMBODIMENT(S)

The following describes embodiments according to the present invention with reference to the drawings.

First Embodiment

A RAU map is stored at the beginning of a RAU in a VC-1 stream according to the first embodiment of the present invention, and a picture decoding apparatus according to the first embodiment specifies a still picture sequence in the RAU by analyzing the RAU map.

Figure 1A:
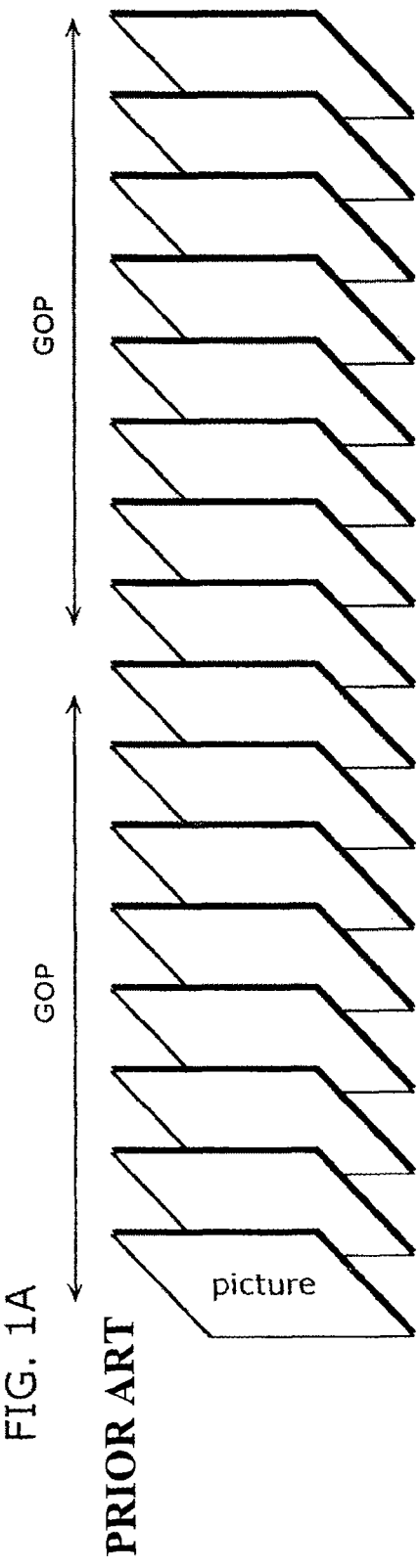
FIGS. 1A and 1B are diagrams showing a structure of the MPEG 2 stream.
Figure 1B:
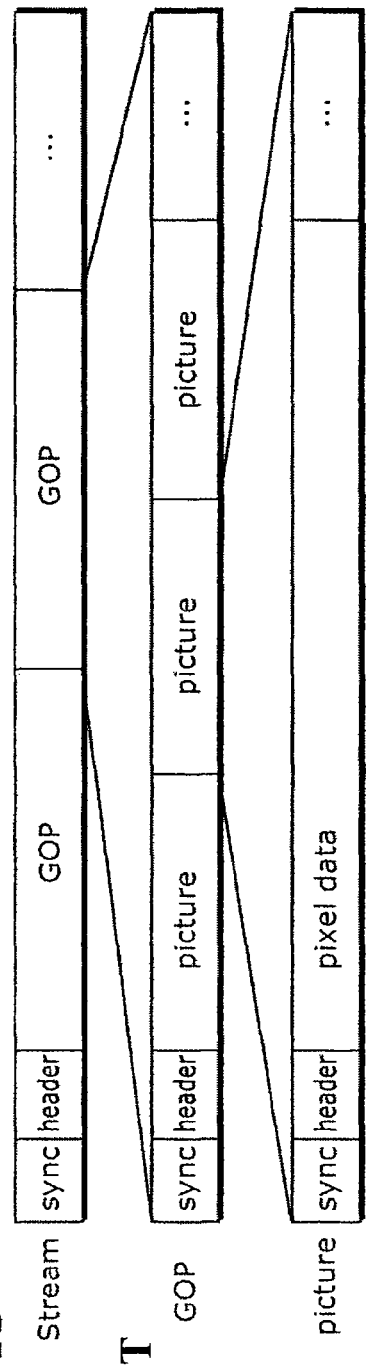
Figure 3:
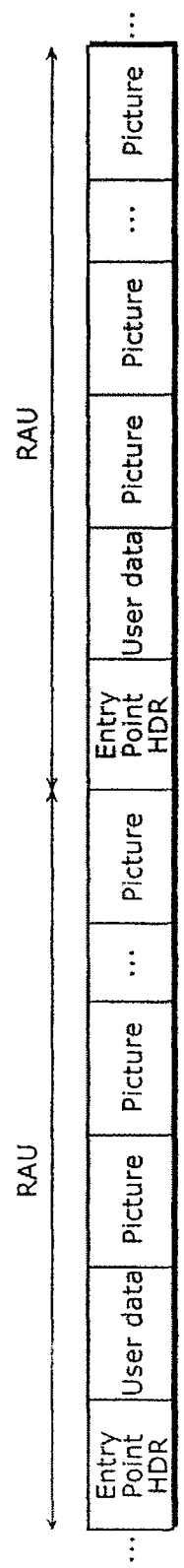
FIG. 3 is a diagram showing a structure of the conventional VC-1 stream.
Figure 4:
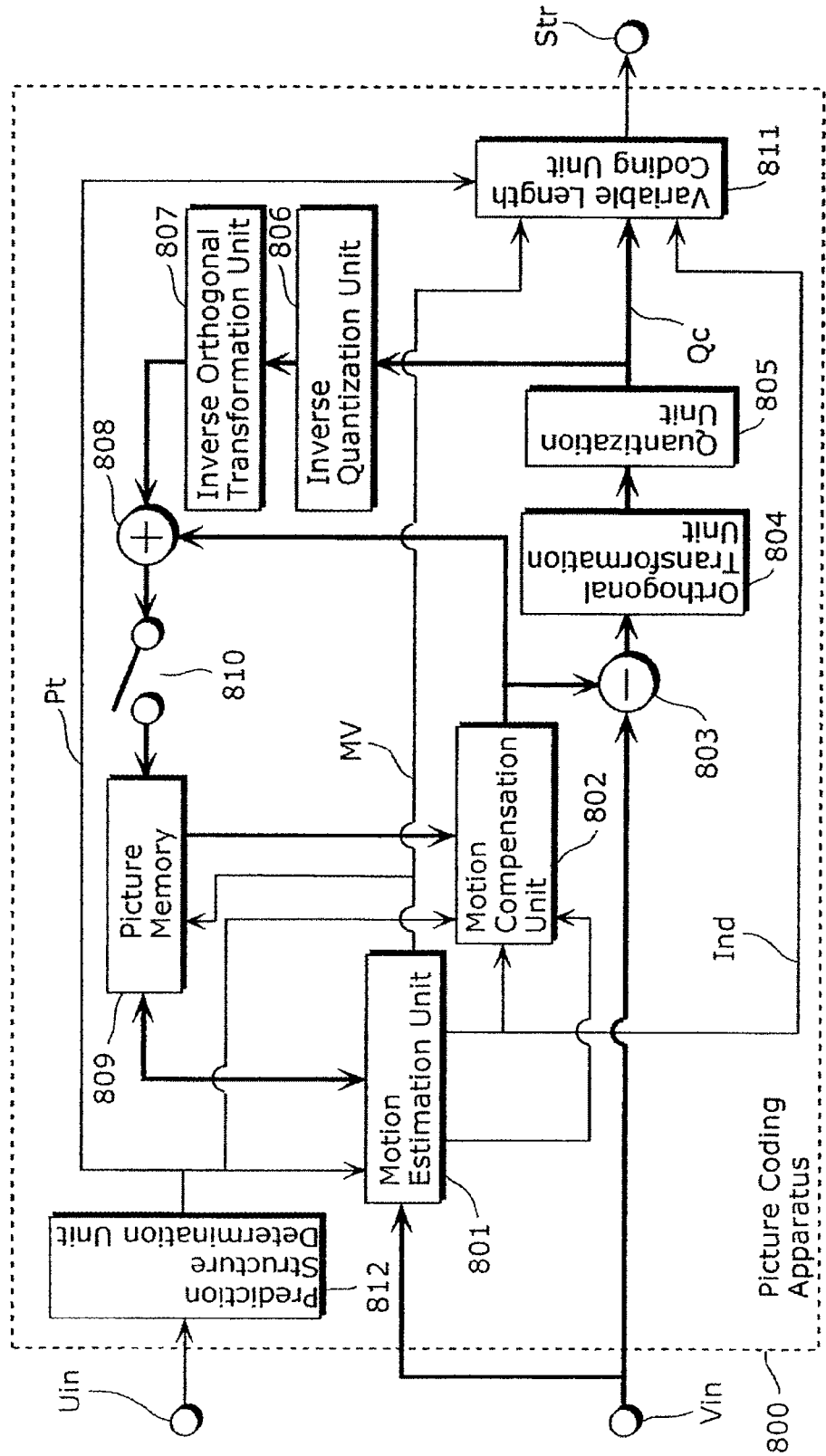
FIG. 4 is a block diagram showing a structure of the conventional picture coding apparatus.
Figure 5:
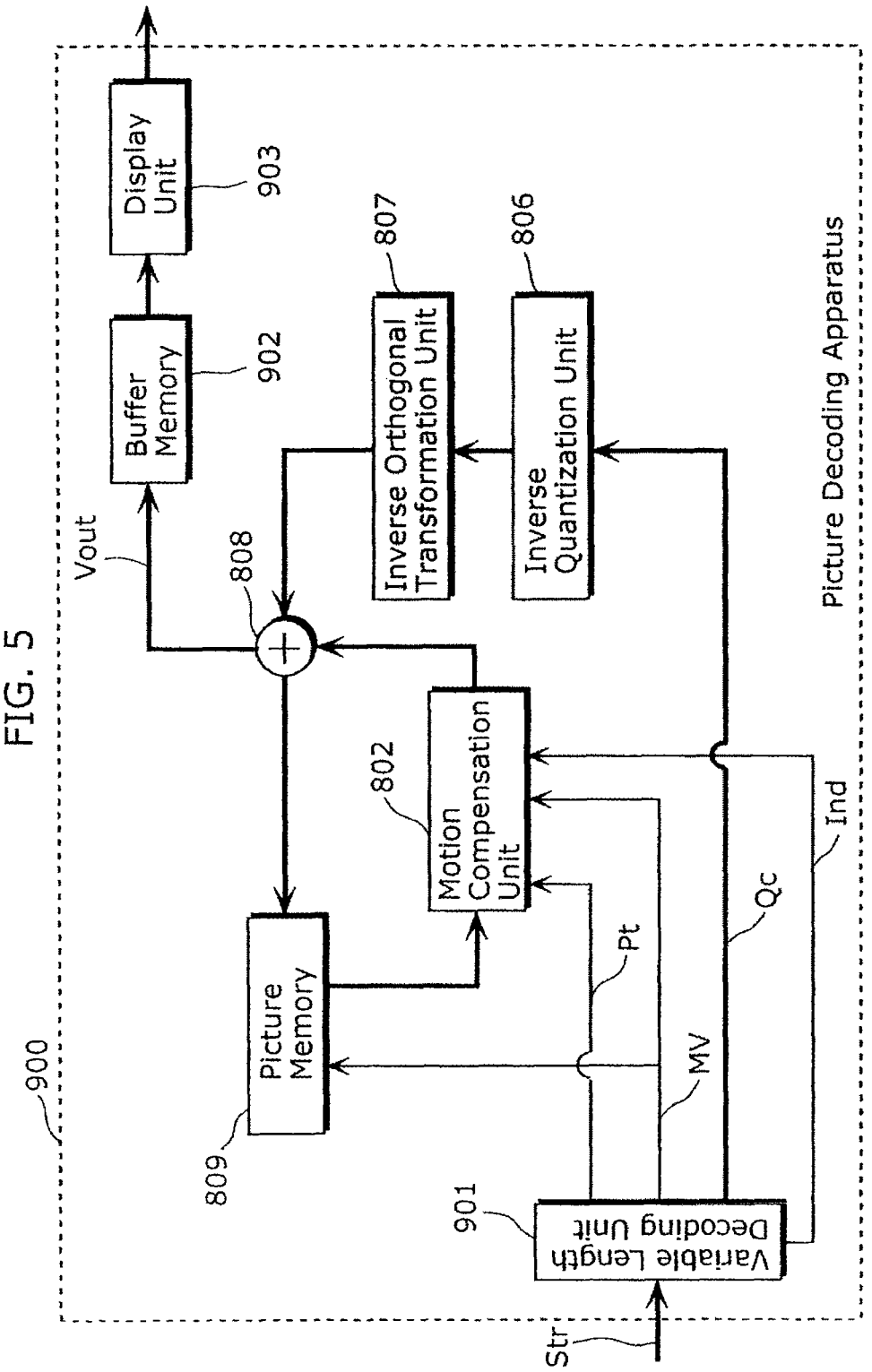
FIG. 5 is a block diagram showing a structure of the conventional picture decoding apparatus.
Figure 6:
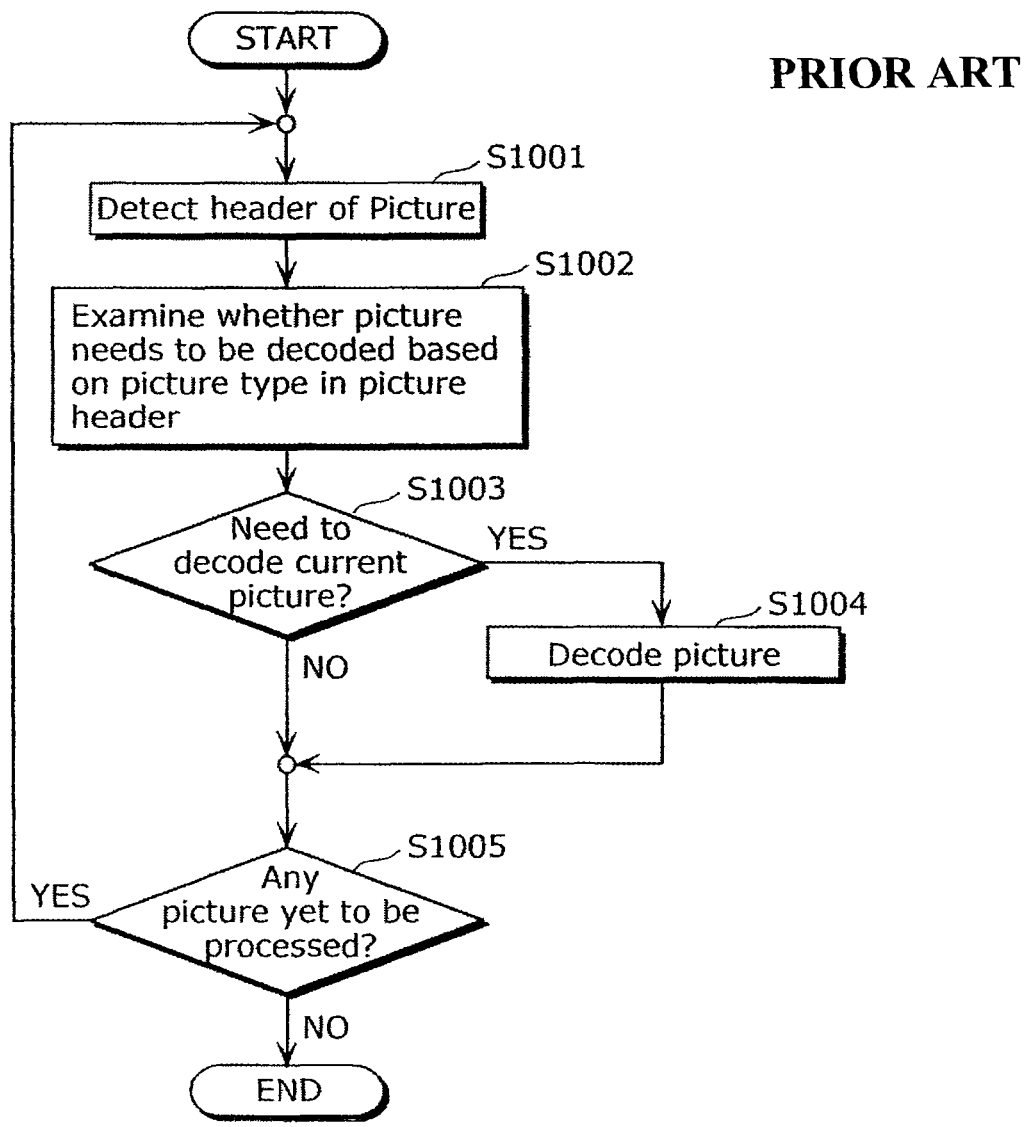
FIG. 6 is a flowchart showing operations which are performed by the conventional picture coding apparatus.
Figure 7:
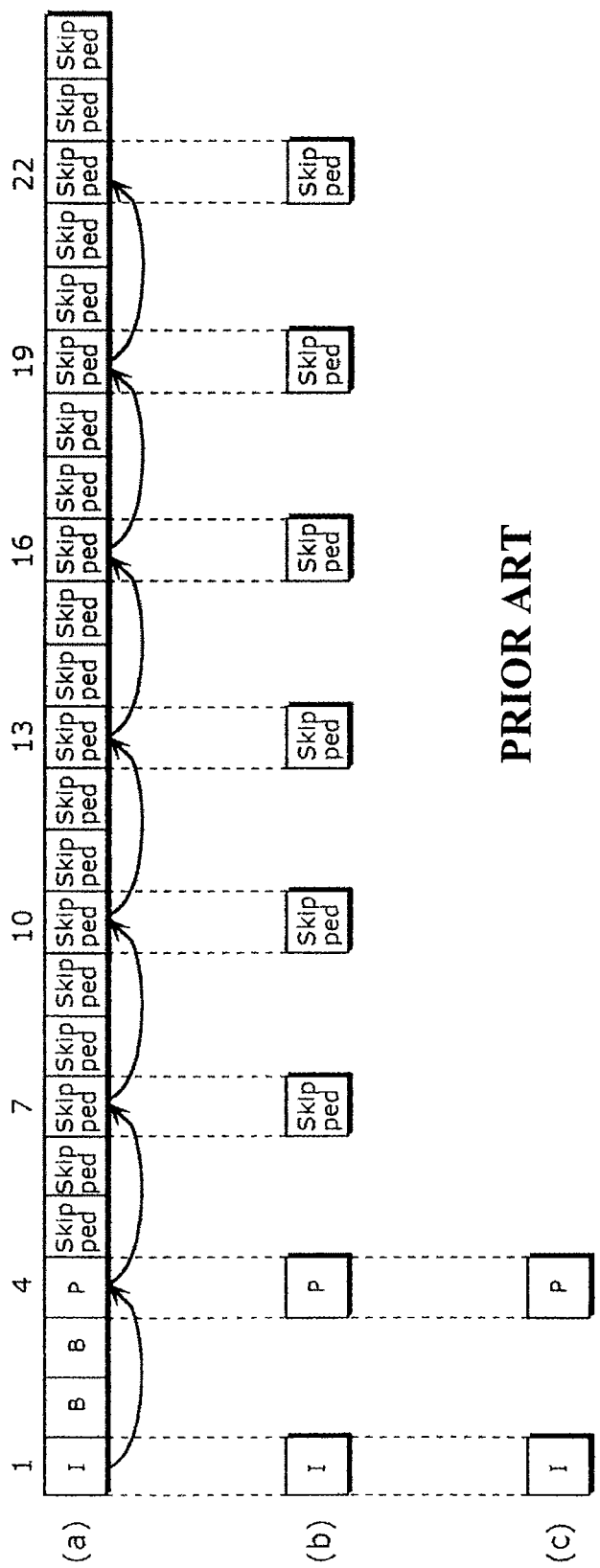
FIG. 7 is a diagram showing a problem in a stream which is generated by the conventional picture coding apparatus, during high-speed play-back.
Figure 8:
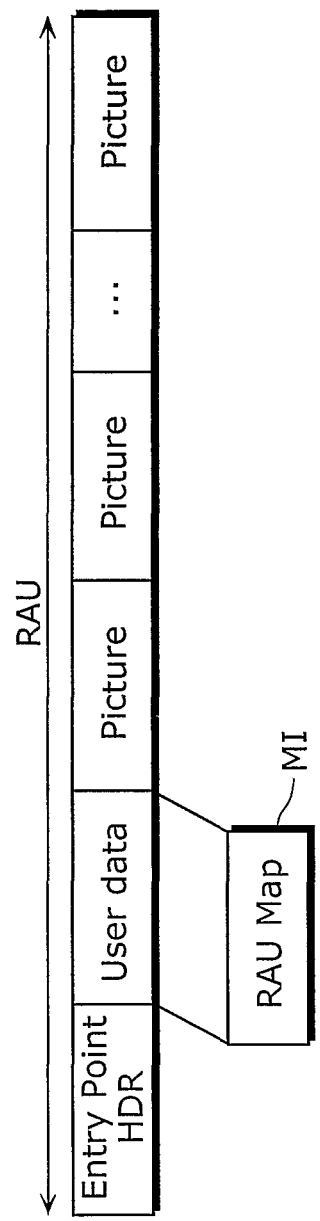
FIG. 8 is a diagram showing an example of a structure of a RAU which is included in a VC-1 stream according to the first embodiment of the present invention.

FIG. 8 is a diagram showing an example of a structure of the RAU which is included in the VC-1 stream according to the first embodiment.

The RAU structure includes an entry point header (Entry Point HDR) and user data which are positioned at the beginning of the RAU, and a plurality of pictures which follow the user data. Note that, in the VC-1 standard, the RAU is referred to as an entry point segment (EPS).

More specifically, the RAU according to the first embodiment differs from the conventional RAU in that the RAU includes a RAU map MI which is arranged in the user data (user data at Entry-point level) and indicates if Skipped pictures are present in the RAU, also specifies a still picture sequence in the RAU.

Therefore, the picture decoding apparatus according to the first embodiment can examine, by referring to the RAU map MI, whether or not the RAU includes any Skipped pictures and can specify the still picture sequence, so that it is possible to specify, without analyzing each picture layer in the RAU, pictures which do not need to be decoded, which results in reducing an amount of data to be decoded.

FIG. 9A is a diagram showing an example of a syntax of the RAU map MI.

num_pic_in_RAU represents the number of pictures in the RAU. frame_field_flag represents whether each picture in the RAU is coded in a field structure or in a frame structure. pic_type represents a picture type (including a Skipped picture type) of each picture. Note that the information regarding each picture is indicated in decoding order. This means that the RAU map MI specifies a still picture sequence in the RAU, by indicating the picture types (including a Skipped picture type) of the pictures in each RAU. Here, the still picture sequence in the first embodiment means a position and a range from a reference picture to a last Skipped picture, in a case where a sequence of a plurality of Skipped pictures follows the reference picture (I-picture or P-picture) in decoding order.

For example, the RAU map MI indicates that pictures from the second picture to a last picture in the RAU are all Skipped pictures. In the above case, by referring to pic_type in the RAU map MI, the picture decoding apparatus determines to decode the starting picture and display the result repeatedly, without decoding the second and following pictures.

Note that the RAU map MI can include further information on 3:2 pulldown which indicates how many fields one frame is equivalent to in being displayed, or whether decoding of the frame starts from a top field or a bottom field, and the like, for each picture.

FIG. 9B is a diagram showing another example of the syntax of the RAU map MI.

In the advanced profile in the VC-1 standard, picture types of the first field and the second field for a frame of field-structure are indicated by a field-picture type which is included in the picture layer. The field-picture type (picture types of the first picture and the second picture) is defined by eight patterns which are (I, I), (I, P), (P, I), (P, P), (B, B), (B, BI), (BI, B), and (BI, BI). Therefore, in a case where a picture consists of fields, it is possible to indicate picture types of both of the first field and the second field which are included in a frame, by indicating the field-picture type.

Therefore, the syntax of the RAU map MI shown in FIG. 9B also indicates a field-picture type of a picture, in a case where the picture consists of fields. More specifically, num_frame_in_RAU represents the number of the frames in the RAU. field_coding_flag represents whether or not the picture consists of fields. In a case where the picture consists of fields, a field-picture type of the picture is represented by field_type_flag, and in a case where the picture does not consists of fields, a picture type of the picture is represented by picture_type.

That is, the RAU map MI, in the same manner as the RAU map MI shown in FIG. 9A, specifies a still picture sequence in a RAU, by indicating picture types of every pictures in each RAU.

Moreover, in a case where the RAU includes only I-pictures and Skipped pictures, or only I-pictures, P-pictures, and Skipped pictures, a part or all parts of the RAU becomes a still picture sequence. In this case, depending on whether a processed part is the still picture sequence or a normal moving-picture sequence, the picture coding apparatus changes the decoding and displaying processing, so that the RAU map MI may include further information regarding whether or not the RAU includes any still picture sequence.

FIG. 9C is a diagram showing still another example of the syntax of the RAU map MI.

In this syntax, motionless_flag represents whether or not the RAU includes any still picture sequence, and start_pic_num and end_pic_num specify the still picture sequence in the RAU. More specifically, in a case where motionless_flag is 1, the RAU map MI indicates that the RAU includes a sill picture sequence. Further, in a case where motionless_flag is 1, the RAU map MI indicates that the still picture sequence starts with an I-picture or P-picture which is represented by start_pic_num, and ends with a Skipped picture which is represented by end_pic_num.

Note that it is possible to set motionless_flag to as 1, only in a case where all parts of the RAU are a still picture sequence or where the RAU includes a still picture sequence which continues longer than a certain time period.

FIG. 9D is a diagram showing other example of the syntax of the RAU map MI.

In this syntax, number_of_pictures_in_EPS represents the number of pictures included in the EPS. picture_structure represents whether a picture is a field or a frame, or represents how many fields one frame is equivalent to in being displayed. picture_type represents which picture type, namely I-picture, P-picture, B-picture, Skipped picture, or the like, the picture belongs to. Further, stuffing_bits is used to align all bits of stuffing_bits, picture_structure, and picture_type, by integral multiplication of eight bits. Furthermore, in this syntax, stuffing_bits, picture_structure, and picture_type are indicated in decoding order, regarding respective pictures included in the EPS.

Such RAU map MI, in the same manner as the RAU map MI shown in FIG. 9A, specifies a still picture sequence in pictures in a RAU, by indicating picture types of the pictures in each RAU (EPS).

Note that, the RAU map MI may store the information regarding respective pictures in an order of displaying the pictures. Note also that the RAU map MI may store further information which indicates whether the information regarding respective pictures are stored in the decoding order or in the display order.

Note also that the RAU map MI may be stored in user data in a layer that is different from an entry point layer, for example, in user data for a starting picture. Note also that, in a case where the RAU does not include any Skipped pictures, the RAU map MI does not need to be generated. In such a case, it is possible to indicate whether or not the RAU includes any Skipped pictures, by examining the existence of the RAU map MI.

Figure 10:
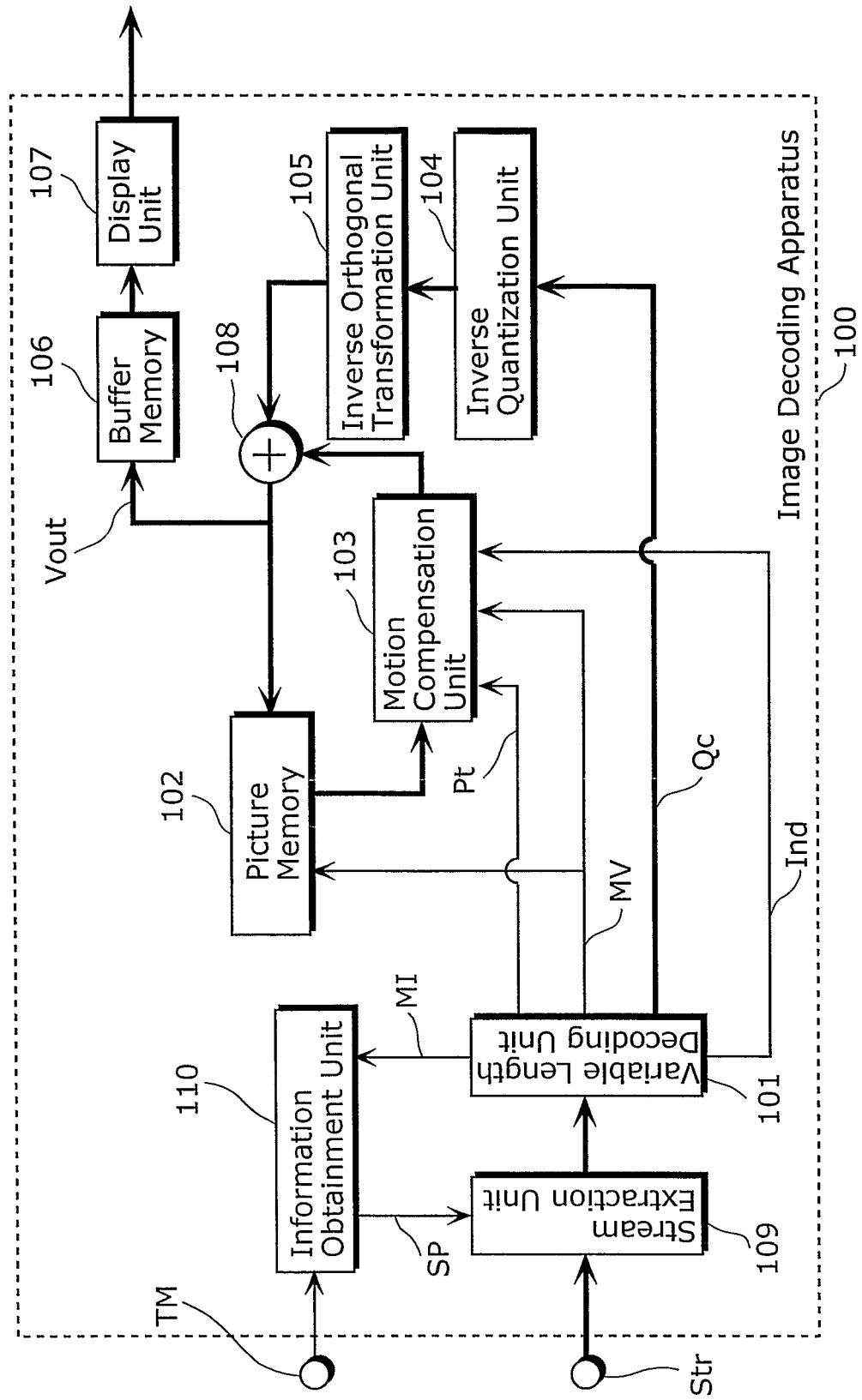
FIG. 10 is a block diagram showing a structure of the picture decoding apparatus according to the first embodiment of the present invention.

FIG. 10 is a block diagram showing a picture decoding apparatus 100 in the first embodiment.

The picture decoding apparatus 100 of the first embodiment which decodes the stream STR that includes the RAU shown in FIG. 8 is comprised of: the variable length decoding unit 101, the picture memory 102, the motion compensation unit 103, the inverse quantization unit 104, the inverse orthogonal transformation unit 105, the buffer memory 106, the display unit 107, the adder 108, a stream extraction unit 109, and an information obtainment unit 110.

This picture decoding apparatus 100 differs from the conventional picture decoding apparatus 900 in that the stream extraction unit 109 and the information obtainment unit 110 are added.

The information obtainment unit 110 obtains the RAU map MI from the variable length decoding unit 101, and also obtains, from the outside, a play-back mode signal TM for instructing details of special play-back such as high-speed play-back. Then, the information obtainment unit 110 analyzes the RAU map MI based on the play-back mode signal TM, and determines (selects) pictures to be decoded. The information obtainment unit 110 outputs a decoding picture instruction signal SP which indicates the determination results, to the stream extraction unit 109.

For example, in a case where the RAU map MI includes the syntax shown in FIG. 9C, the information obtainment unit 110 determines, based on motionless_flag, whether or not the RAU to be play-backed includes any still picture sequence. Then, if the determination is made that the RAU includes a still picture sequence, the information obtainment unit 110 specifies the still area, based on start_pic_num and end_pic_num. After specifying the still picture sequence, the information obtainment unit 110 determines, from the pictures to be play-backed which are indicated by the play-back mode signal TM, only pictures which are not included in the still picture sequence, as pictures to be decoded, and the information obtainment unit 110 outputs the determination results to the decoding picture instruction signal SP. However, if the pictures to be play-backed which are indicated by the play-back mode signal TM include a picture in the still picture sequence, the starting picture of the still picture sequence is determined to be the picture to be decoded.

Further, if the RAU map MI includes the syntax shown in FIG. 9D, the information obtainment unit 110 specifies a still picture sequence, based on picture_type which is indicated for each picture in the RAU. Then, the information obtainment unit 110 determines, from the pictures to be play-backed which are indicated by the play-back mode signal TM, only pictures which are not included in the still picture sequence, as pictures to be decoded, and the information obtainment unit 110 outputs the determination results to the decoding picture instruction signal SP. However, as described above, if the pictures to be play-backed which are indicated by the play-back mode signal TM include a picture in the still picture sequence, the starting picture of the still picture sequence is determined to be the picture to be decoded.

After obtaining the stream STR, the stream extraction unit 109 firstly detects, for each RAU, the coded RAU map MI which is positioned at the beginning of the RAU, and outputs the RAU map MI to the variable length decoding unit 101. After obtaining the decoding picture instruction signal SP which is outputted from the information obtainment unit 110 based on the RAU map MI, the stream extraction unit 109 extracts, from the stream STR, data of the pictures to be decoded which are indicated by the decoding picture instruction signal SP, and outputs the data to the variable length decoding unit 101.

When the variable length decoding unit 101 obtains the coded RAU map MI from the stream extraction unit 109, the variable length decoding unit 101 performs variable length decoding on the coded RAU map MI, and outputs the decoded RAU map MI to the information obtainment unit 110. Further, when the variable length decoding unit 101 obtains, from the stream extraction unit 109, the data of the pictures which are included in the stream STR, the variable length decoding unit 101 performs variable length decoding on the data, and outputs a quantization value Qc, a reference picture specification information Ind, a picture type Pt, and a motion vector MV.

The motion compensation unit 103 retrieves an image which is indicated by the motion vector MV, from the decoded picture (reference picture) which is stored in the picture memory 102 and indicated by the reference picture specification information Ind, and outputs the image as a predicted picture to the adder 108.

The inverse quantization unit 104 inversely quantizes the quantization value Qc to be restored as a frequency coefficient, and outputs the frequency coefficient into the inverse orthogonal transformation unit 105. The inverse orthogonal transformation unit 105 performs inverse-frequency transformation on the frequency coefficient to be transformed into a pixel differential, and outputs the pixel differential to the adder 108. The adder 108 adds the pixel differential with the predicted picture which is outputted from the motion compensation unit 103, and generates a decoded picture Vout. Then, the adder 108 stores the decoded picture Vout into the picture memory 102 and the buffer memory 106. The display unit 107 obtains the decoded picture Vout from the buffer memory 106, and displays a picture corresponding to the decoded picture Vout. Note that the picture memory 102 and the buffer memory 106 may share a single memory.

Note also that the stream extraction unit 109 may output data of all pictures which are included in the RAU, into the variable length decoding unit 101. In this case, the variable length decoding unit 101 selects, from all pictures included in the RAU, pictures which need to be decoded, based on the decoding picture instruction signal SP which is outputted from the information obtainment unit 110. Then, the variable length decoding unit 101 performs variable length decoding on data of the selected pictures. Note that the information obtainment unit 110 may specify the picture to be decoded only for special play-back, such as high-speed play-back and inverse play-back. In case of normal play-back, it can be determined to decode all the pictures without analyzing the RAU map.

Figure 11:
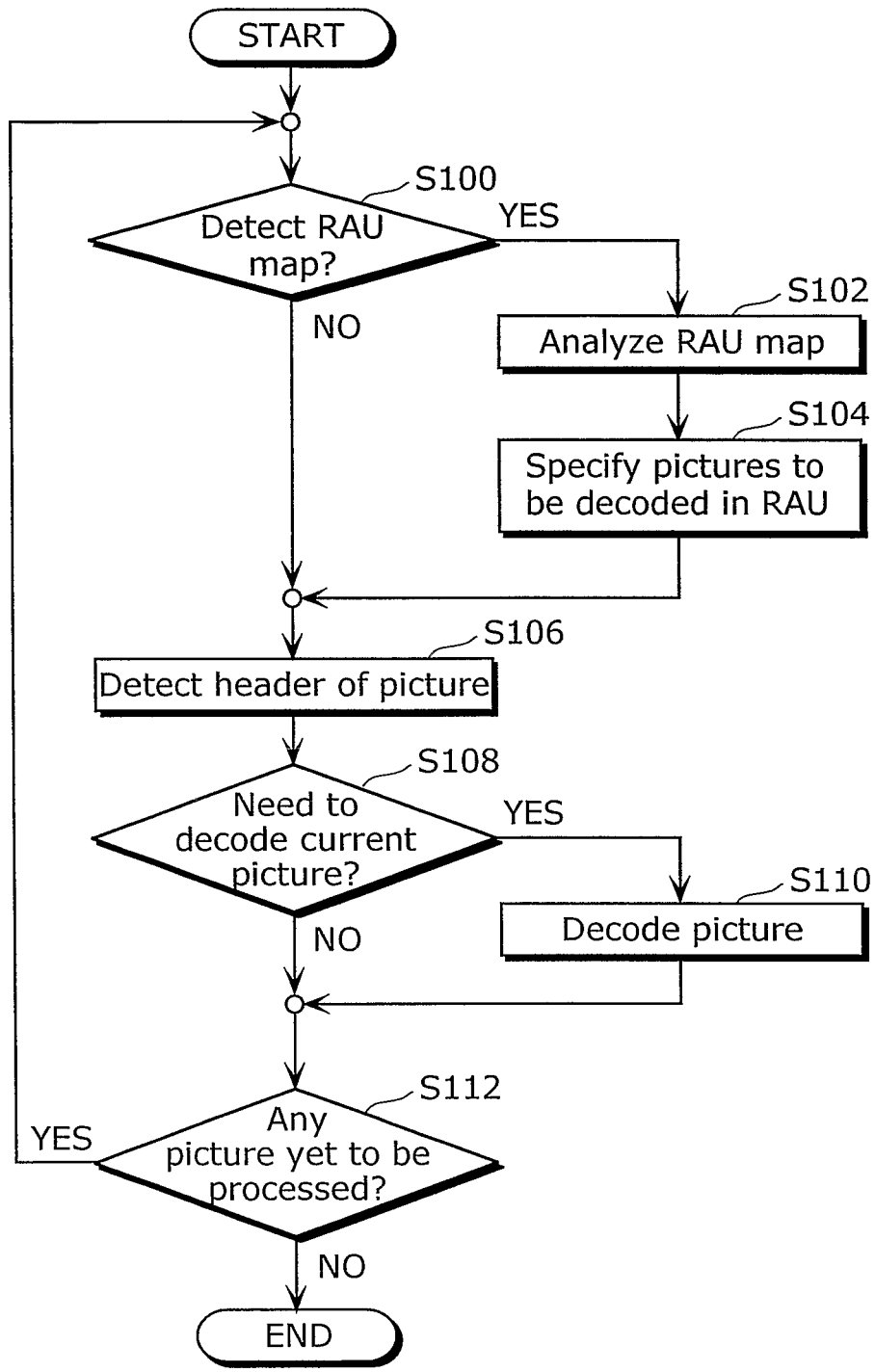
FIG. 11 is a flowchart showing operations which are performed by the picture decoding apparatus according to the first embodiment of the present invention.

FIG. 11 is a flowchart showing operations which are performed by the picture decoding apparatus 100 according to the first embodiment.

When the picture decoding apparatus 100 receives an instruction to start special play-back, the picture decoding apparatus 100 firstly determines whether or not the RAU map MI is stored in user data in an entry point layer (Step S100). In other words, the picture decoding apparatus 100 determines whether or not the RAU map MI is detected. If the picture decoding apparatus 100 detects the RAU map MI (YES at Step S100), then the processing proceeds to Step S102, and if not (NO at Step S100), then the processing skips directly to Step S106.

More specifically, if the picture decoding apparatus 100 detects the RAU map MI (YES at Step S100), the picture decoding apparatus 100 analyzes the RAU map MI (Step S102), and determines (selects), from the pictures in the RAU which are to be play-backed during special play-back, pictures to be decoded, based on result of the analysis (Step S104).

Note that, when the special play-back of the RAU starts, the picture decoding apparatus 100 always detects the RAU map MI at Step S100, and specifies pictures in the RAU to be decoded. In other words, when the special play-back of the RAU starts, the picture decoding apparatus 100 in the first embodiment selects, based on the RAU map MI, from the pictures which are included in the RAU and to be play-backed during the special play-back, pictures except Skipped pictures, as the pictures to be decoded.

In case the RAU map MI is not detected at Step S100, or after the pictures to be decoded are specified at Step S104, the picture decoding apparatus 100 detects a header of the picture (start code) in the pictures which are in the RAU and to be play-backed during the special play-back (Step S106).

Next, the picture decoding apparatus 100 examines whether or not the picture whose header has been detected at Step 106 and which is a picture to be play-backed during the special play-back among the pictures that have been specified to be decoded at Step S104 (Step S108). Here, if the determination is made that the picture is among the pictures which have been specified to be decoded (YES at Step S108), the picture decoding apparatus 100 decodes the picture (Step S110).

In case determination is made that the picture is not among the pictures which have been specified to be decoded at Step S104 (NO at Step S108), or after the picture is decoded at Step S110, the picture decoding apparatus 100 examines whether or not there are still any pictures to be processed (Step S112).

If no picture to be processed is found (NO at Step S112), then the picture decoding apparatus 100 completes all operations, and if there is still pictures to be processed (YES at Step S112), then the picture decoding apparatus 100 repeats the operations from Step S100. For example, in a case where the RAU map MI has been detected at Step S100 in the previous processing, and the following processing proceeds to Step 100 for the same RAU, the picture decoding apparatus 100 does not need to detect the RAU map MI at S100 (NO at Step S100), but performs the operation at Step S106, namely, detects a header of the next picture to be play-backed during the special play-back.

As described above, the image decoding method in the first embodiment differs from the conventional image decoding method in that the operations from Step S100 to Step S104 are included.

Figure 12:
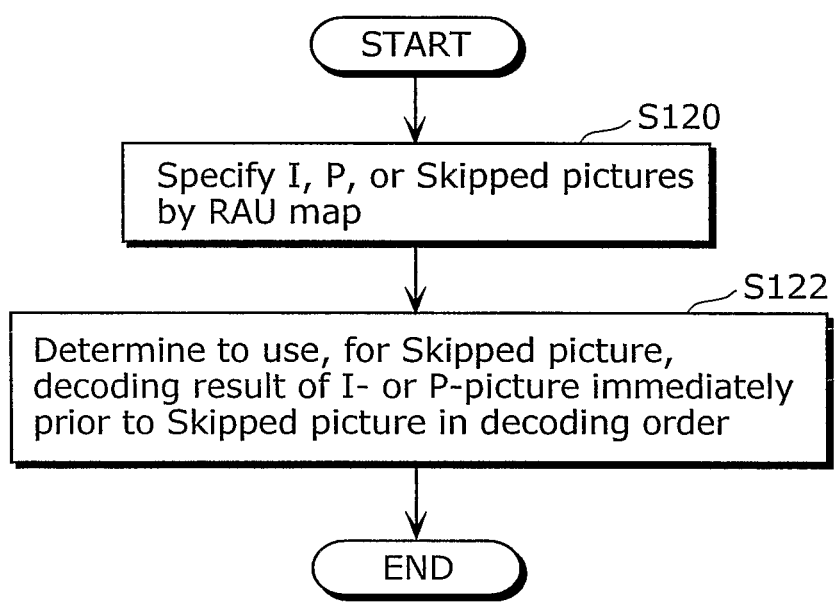
FIG. 12 is a flowchart showing operations of analyzing a RAU map which are performed by the picture decoding apparatus according to the first embodiment of the present invention.

FIG. 12 is a flowchart showing operations of analyzing the RAU map MI which are performed by the picture decoding apparatus 100 according to the first embodiment.

For example, in a case where the RAU map MI includes the syntax shown in FIG. 9D, the picture decoding apparatus 100 firstly analyzes the RAU map MI, and specifies I-pictures, P-pictures, and Skipped pictures, from the pictures which are included in the RAU and to be play-backed during the special play-back (Step S120).

Next, in a case where the picture to be play-backed during the special play-back is a Skipped picture, the picture decoding apparatus 100 determines to use a result of decoding an I-picture or a P-picture which is immediately prior to the Skipped picture in decoding order, as a picture corresponding to the Skipped picture (Step S122).

Note that, even in normal play-back which is not the special play-back, it is possible to specify, by referring to the RAU map MI, Skipped picture and the like, when the play-back of the RAU starts.

When the Skipped picture included in the RAU is displayed, the picture decoding apparatus 100 displays the result of decoding the I-picture or the P-picture which is specified at Step S122 and is immediately prior to the Skipped picture.

Figure 13C:
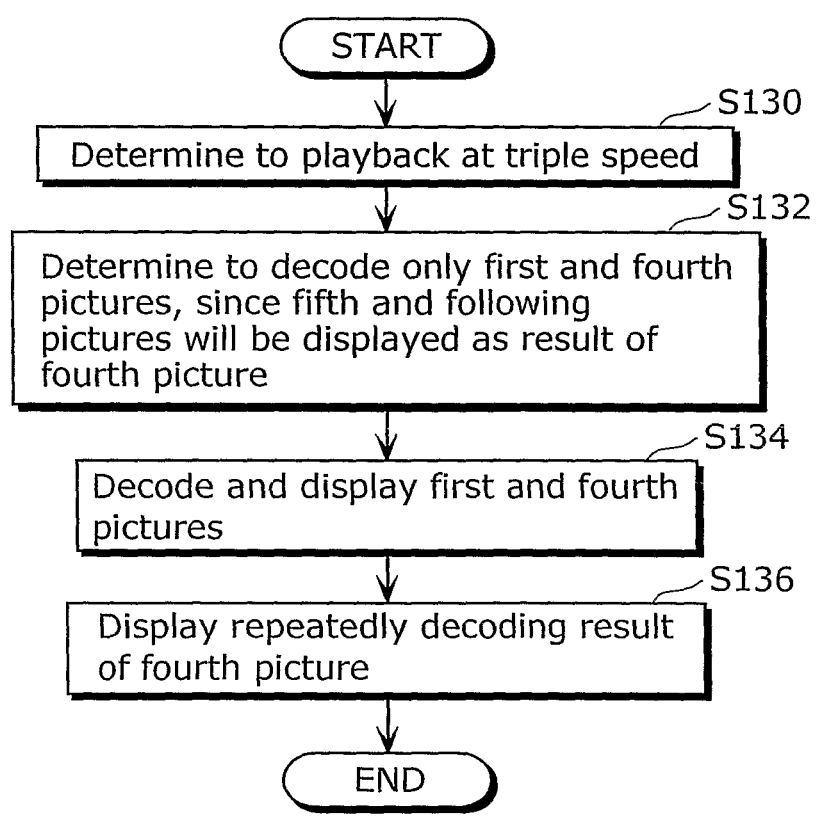
FIG. 13C is a flowchart showing operations of play-backing at a high speed a stream STR having the RAU in FIG. 13A, which is performed by the picture decoding apparatus according to the first embodiment of the present invention.

Here, with reference to FIGS. 13A, 13B, and 13C, operations of high-speed play-back which are performed by the picture decoding apparatus according to the first embodiment.

FIG. 13A is a diagram showing a RAU which is play-backed at a high speed.

The first picture counted from the beginning of the pictures is an I-picture, the second and third pictures are B-pictures, and the fourth picture is a P-picture. The fifth and following pictures are all Skipped pictures. Note that all of the pictures are frames.

FIG. 13B is a diagram showing a RAU map MI which corresponds to FIG. 13A. The RAU map MI includes the syntax shown in FIG. 9A. Here, all pictures are frames, so that frame_field_flag are set to as 1 for all pictures. Further, pic_type is set to as I-picture, P-picture, B-picture or Skipped picture, for each picture. Note that, in FIG. 13B, pic_type is set to as "I", "P", "B", or "Skipped", but, in actual practice, pic_type can also be set to as a numeric value which represents the picture type.

FIG. 13C is a flowchart showing operations of high-speed play-back of a stream STR that includes the RAU in FIG. 13A, which is performed by the picture decoding apparatus 100 according to the first embodiment.

Firstly, the picture decoding apparatus 100 determines to play-back at triple speed the RAU in FIG. 13A which is included in the stream STR (Step S130). Note that the play-back at triple speed is a common high-speed play-back, and is the same processing by which only I-pictures and P-pictures are play-backed, in a case where a stream structure of the RAU includes I-picture, B-picture, B-picture, P-picture, B-picture, B-picture, P-picture, B-picture, B-picture, . . . in decoding order.

Next, the picture decoding apparatus 100 determines, based on a result of analyzing the RAU map MI shown in FIG. 13B, that pictures from the fifth picture to the twenty-fourth picture are all Skipped pictures and that a range from the fourth picture to the twenty-fourth picture is a still picture sequence. Then, the picture decoding apparatus 100 determines to decode only first and fourth pictures, since a result of decoding the fourth picture is used as pictures to be displayed for the fifth and following pictures (Step S132). Subsequently, the picture decoding apparatus 100 decodes and displays the first and fourth pictures (Step S134). Furthermore, the picture decoding apparatus 100 displays the result of decoding the fourth picture repeatedly instead of results of decoding the seventh, tenth, thirteenth, sixteenth, nineteenth, and the twenty-second pictures.

Note that the first embodiment has described that each RAU of the VC-1 stream includes a RAU map and that the picture decoding apparatus 100 decodes the stream, but it is possible to apply any coding method to code the stream, besides the MPEG-4AVC and the MPEG-2 standards, as far as the stream includes the RAU map. Here, even if a coding method in which the same picture type as Skipped picture is not defined is applied, the method can distinguish a picture from other pictures by regarding the picture as a Skipped picture in the RAU map, as far as a type of the picture is actually the same as Skipped picture.

(Variation)

The following describes a variation of a play-back method which is performed by the picture decoding apparatus 100 according to the first embodiment.

For example, there would be a case that decoding of the starting picture in the still picture sequence does not complete within a decoding time period which ranges from a decoding time stamp (DTS) to a presentation time stamp (PTS). Therefore, in the variation of the first embodiment, even if the decoding of the starting picture has not completed by the PTS, the starting picture is displayed after the decoding completes.

FIG. 14 is an explanatory diagram showing the play-back method which is performed by the picture decoding apparatus according to the variation of the first embodiment.

DTS2 represents a decoding time stamp which is included in a header of a packet (referred to as a PES packet) having a code of a starting picture pic2 in a still picture sequence, in other words, represents a time of decoding the starting picture pic2. PTS2 represents a presentation time stamp which is included in the header of the packet having the code of the starting picture pic2, in other words, represents a time of presentation (output or display) of the starting picture pic2. DTS1, PTS1 and PTS3 represent respective times in the same manner as described above.

For example, the picture decoding apparatus 100, as shown in FIG. 14, starts decoding the starting picture pic2 at DTS2. However, there is a case that a decoding completion time is after the PTS2. Therefore, in a case where a decoding completion time for the starting picture in the still picture sequence is after PTS2, the picture decoding apparatus 100 according to the variation of the first embodiment starts presentation at a time of a frame-grid which is immediately after the decoding completion time.

Thus, in a case where the decoding starts at a decoding time stamp which is included in the coded starting picture, but the decoding has not completed by a presentation time stamp, the picture decoding apparatus 100 according to the variation of the first embodiment adds a margin to the presentation time stamp and displays the decoded starting picture at such presentation time stamp with the margin.

Figure 15:
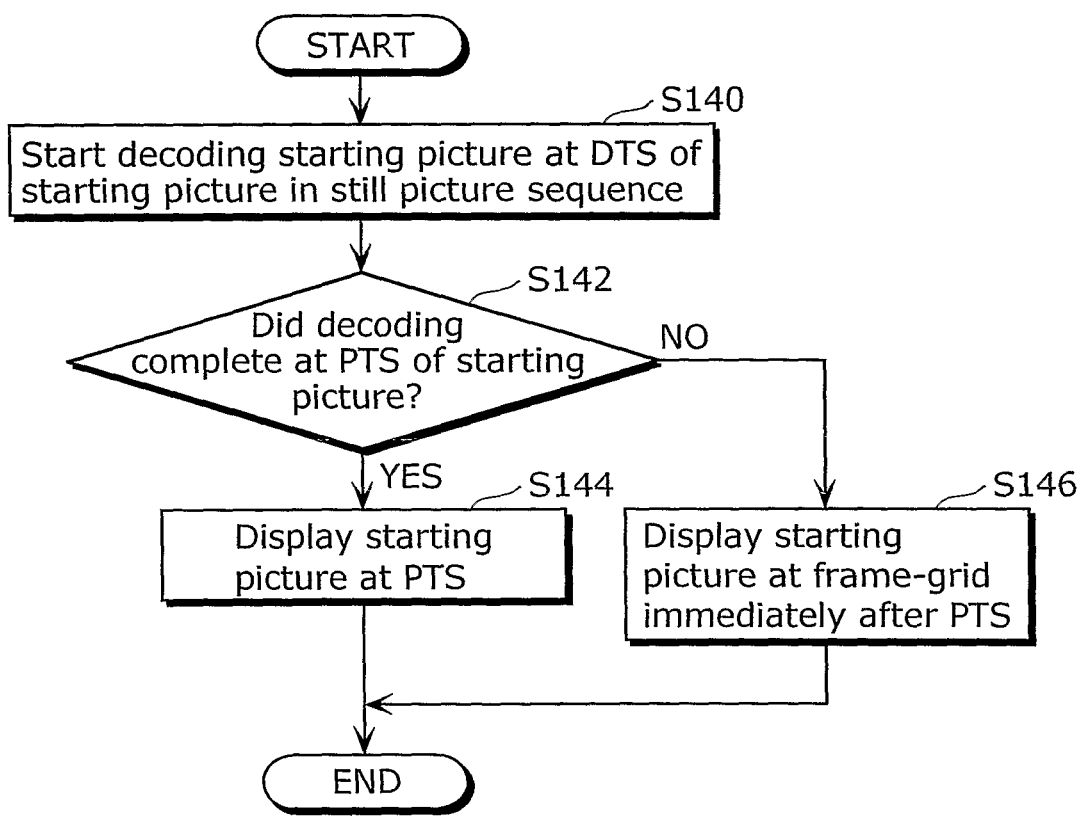
FIG. 15 is a flowchart showing the play-back method which is performed by the picture decoding apparatus according to the variation of the first embodiment.

FIG. 15 is a flowchart showing the play-back method which is performed by the picture decoding apparatus 100 according to the variation of the first embodiment.

The picture decoding apparatus 100 according to the variation of the first embodiment starts decoding a starting picture at a DTS of the starting picture in the still picture sequence (Step S140). Then, the picture decoding apparatus 100 determines whether or not the decoding has completed by a PTS of the starting picture (Step S142). Here, if the determination is made that the decoding has completed (YES at Step S142), then the picture decoding apparatus 100 displays the decoded starting picture, at the PTS (Step S144). On the other hand, if the determination is made that the decoding has not yet completed (NO at Step S142), then the picture decoding apparatus 100 displays the decoded starting picture, at a time immediately after the PTS, namely, at a time of a frame-grid immediately after completing the decoding (Step S146).

Thus, according to the play-back method which is performed by the picture decoding apparatus 100 of the variation of the first embodiment, in a case where the decoding of the starting picture in the still picture sequence is delayed and has not completed by the PTS, a display time of the starting picture is also able to be delayed, so that it is possible to improve picture quality in the sill picture sequence, compared to a case where the starting picture is not displayed.

Second Embodiment

Figure 16:
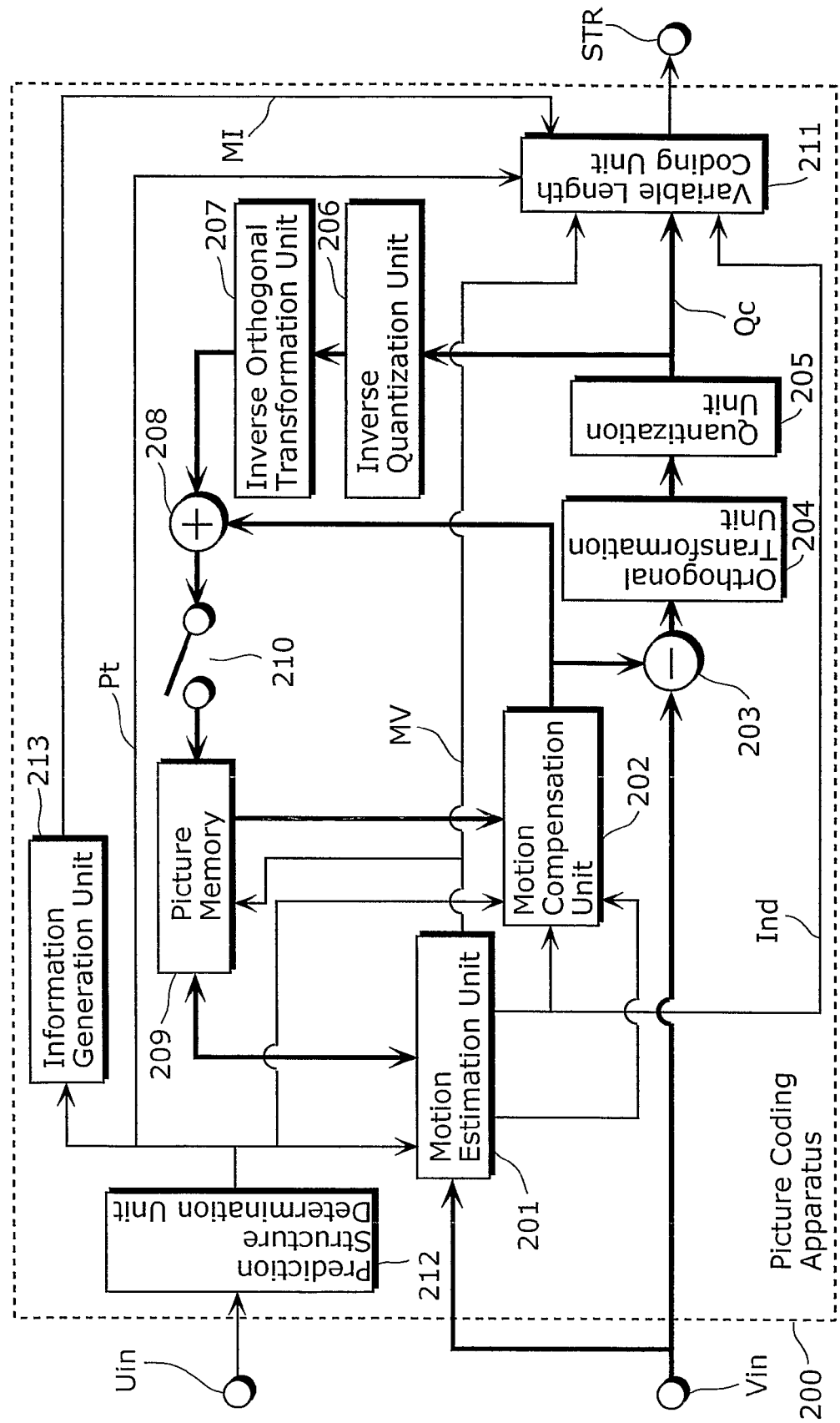
FIG. 16 is a block diagram showing a structure of a picture coding apparatus according to the second embodiment of the present invention.

FIG. 16 is a block diagram showing a picture coding apparatus according to the second embodiment of the present invention.

The picture coding apparatus 200 according to the second embodiment is comprised of: a motion estimation unit 201, a motion compensation unit 202, a subtractor 203, an orthogonal transformation unit 204, a quantization unit 205, an inverse quantization unit 206, an inverse orthogonal transformation unit 207, an adder 208, a picture memory 209, a switch 210, a variable length coding unit 211, a prediction structure determination unit 212, and an information generation unit 213.

The motion estimation unit 201 obtains an image signal Vin in units of macroblocks. Then, the motion estimation unit 201 searches decoded pictures (reference pictures) which are stored in the picture memory 209, and detects an image having the most similar image to a macroblock indicated by the picture signal Vin. The motion estimation unit 201 determines a motion vector MV which indicates a location of the image and outputs the vector MV. The motion estimation unit 201 outputs a reference picture specification information Ind which indicates a decoded picture that has been used to detect the motion vector MV.

The motion compensation unit 202 retrieves the image which is indicated by the motion vector MV, from the decoded pictures which are stored in the picture memory 209 and indicated by the reference picture specification information Ind, and outputs the image as a predicted picture.

The picture prediction structure determination unit 212 determines, based on a RAU start picture Uin, that a picture to be coded is at a RAU start position, then instructs, using a picture type Pt, the motion estimation unit 801 and the motion compensation unit 802 to code (inter-picture coding) the picture as a randomly-accessible picture, and further instructs the variable length coding unit 811 to code the picture type Pt. More specifically, the prediction structure determination unit 212 specifies a picture type, for example, I-picture, P-picture, B-picture, Skipped picture, or the like, for each picture to be coded which is included in the picture signal Vin.

The subtractor 203 obtains the picture signal Vin and the predicted picture, then calculates a differential between the picture signal Vin and the predicted picture, and outputs the differential to the orthogonal transformation unit 204. The orthogonal transformation unit 204 transforms the differential into a frequency coefficient, and outputs the frequency coefficient into the quantization unit 205. The quantization unit 205 quantizes the frequency coefficient which is inputted from the orthogonal transformation unit 204, and outputs the resulting quantization value Qc into the variable length coding unit 211.

The inverse quantization unit 206 inversely quantizes the quantization value Qc in order to restore the original frequency coefficient, and outputs the resulting frequency coefficient to the inverse orthogonal transformation unit 207. The inverse orthogonal transformation unit 207 performs inverse-frequency transformation on the frequency coefficient to be transformed into a pixel differential, and outputs the pixel differential to the adder 208. The adder 808 adds the pixel differential with the predicted picture which is outputted from the motion compensation unit 202, and generates a decoded picture. The switch 210 is On when the decoded picture is instructed to be stored, and the decoded picture is stored into the picture memory 209.

The information generation unit 213 generates a RAU map MI as shown in one of FIGS. 9A to 9D, according to the picture type Pt which is specified by the prediction structure determination unit 212, and outputs the generated RAU map MI to the variable length coding unit 211.

The variable length coding unit 211 performs variable length coding on the quantization value Qc, the picture type Pt, the RAU map M, the motion vector MV, and the like, in order to generate a stream STR.

As described above, the picture coding apparatus 200 according to the second embodiment differs from the conventional picture coding apparatus 800 in that the information generation unit 213 is included.

Figure 17:
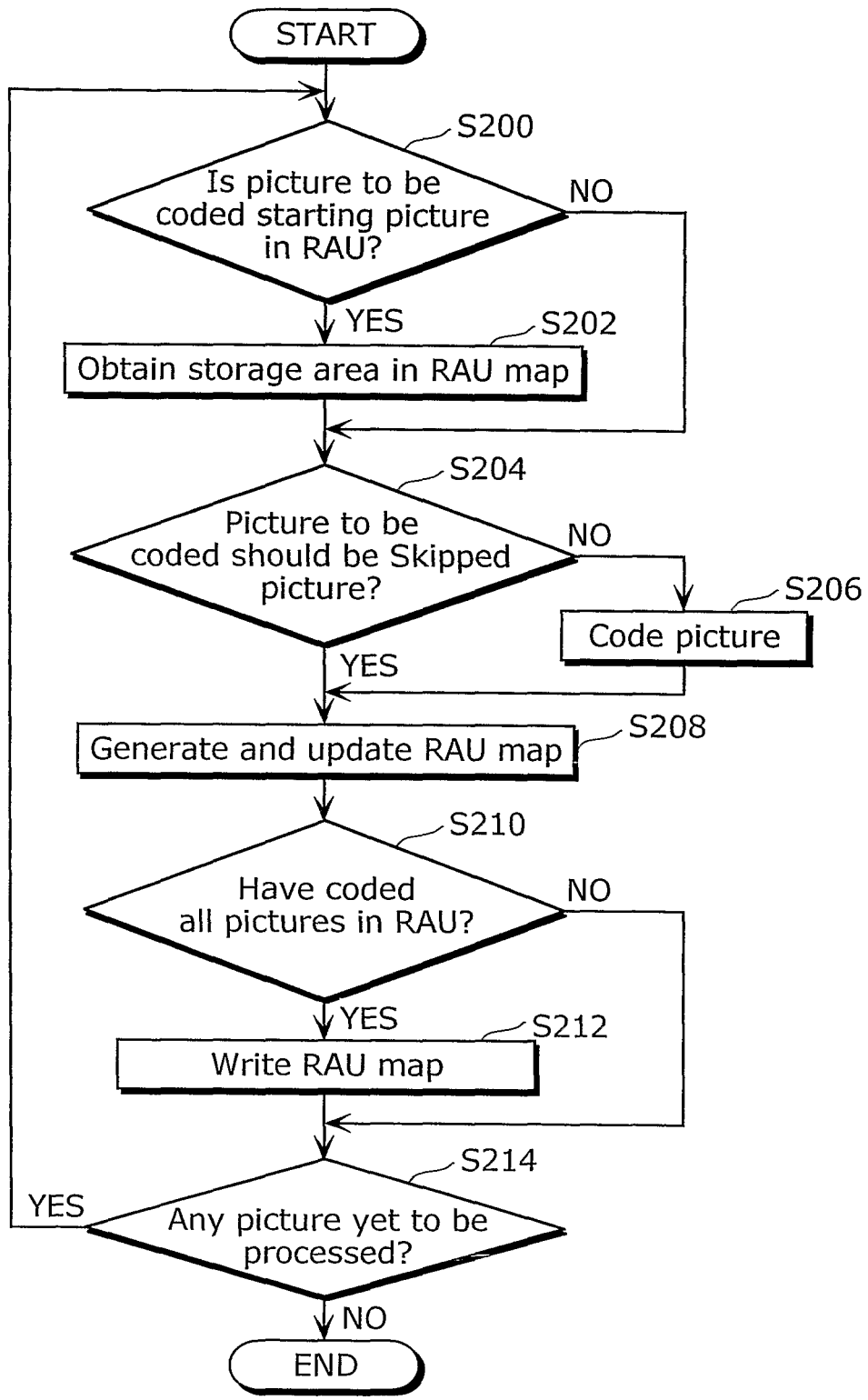
FIG. 17 is a flowchart showing operations which is performed by the picture coding apparatus according to the second embodiment of the present invention.

FIG. 17 is a flowchart showing operations which are performed by the picture coding apparatus 200 according to the second embodiment.

Firstly, the picture coding apparatus 200 determines, by using the prediction structure determination unit 212, whether or not a picture to be coded is a starting picture in a RAU (Step S200). Here, if the determination is made that the picture is the starting picture in the RAU (YES at Step S200), the picture coding apparatus 200 performs, by using the variable length coding unit 211, initialization processing to generate the RAU map MI, and obtains an area for storing the RAU map MI in a user data of an entry point layer (Step S202).

Furthermore, the picture coding apparatus 200 determines, by using the prediction structure determination unit 212, whether or not the picture to be coded as a Skipped picture (Step S204). Here, if the determination is made that the picture is not be a Skipped picture (NO at Step S204), then the picture coding apparatus 200 codes pixel data of the picture to be coded (Step S206).

Then, the picture coding apparatus 200 generates and updates, by the information generation unit 213, a RAU map MI, based on a result of the determination at Step S204 (Step S208).

For example, the picture coding apparatus 200 generates the RAU map MI as shown in FIG. 9D, in order to include a picture type of the picture which is coded at Step S206, information indicating whether the picture is a field or a frame, and the like. The picture coding apparatus 200 may also generate the RAU map MI as shown in FIG. 9C, in order to include an indication of a still picture sequence.

Next, the picture coding apparatus 200 determines whether or not the picture determined at Step S204 is a last picture in the RAU (Step S210). In other words, the picture coding apparatus 200 determines whether or not the processing has been performed for all pictures which are included in the RAU. Here, if the determination is made that the picture is a last picture (YES at Step S210), then the picture coding apparatus 200 specifies and codes the RAU map MI, by using the variable length coding unit 211, and writes the RAU map MI into the area which is obtained at Step S202 (Step S212).

Then, the picture coding apparatus 200 determines whether or not there are still pictures to be processed, among pictures included in the stream STR (Step S214). Here, if the determination is made that there is still a picture to be processed (YES at Step S214), then the picture coding apparatus 200 repeats operations from Step S200, and if the determination is made that no picture to be processed is found (NO at Step S214), then the picture coding apparatus 200 completes all coding operations.

Note that, in a case where the information regarding the RAU map MI is not known, or a case where a buffer memory is added in order to buffer data of pictures which are included in the RAU, it is possible to skip Step S202. In this case, the storage area for the RAU map MI is obtained at Step S212, and the RAU map MI is stored in the user data of the entry point layer.

Note also that the picture coding apparatus 200 may generate the stream STR which includes Skipped pictures, with a fixed bit rate. The amount for coding one Skipped picture is about 1 byte, and it is necessary to adjust a size of the stream STR by inserting padding data, when coding the picture signal Vin with a fixed bit rate. Here, the padding data may be inserted only in Skipped pictures. Thereby, it is possible to decode the picture without consuming time for processing the padding data which is inserted in a slice of the data in the picture.

Note also that a sequence layer and the information of the entry point layer need to be read out firstly during the special play-back, so it is desirable to downsize the data as much as possible. Therefore, it can be determined not to insert the padding data between the sequence layer and the entry point layer.

It is also possible to multiplex and record the stream STR which is generated by the coding method according to the second embodiment, together with audio data. Examples of the multiplexing method are a method which is standardized for each packaged media and the like, such as a method using a transport stream packet of the MPEG-2 system or a packet which is defined in Blu-ray Disc (BD).

Moreover, in the simple profile and the main profile, Skipped picture cannot be identified by the picture type in the picture layer.

Therefore, even if the picture type in the picture layer for each picture is I-picture, P-picture, B-picture, or BI-picture, the picture coding apparatus 200 according to the second embodiment may examine, based on a size of the picture, whether or not the picture is a Skipped picture, and if the picture is a Skipped picture, then the RAU map MI may be generated to indicate that the picture is a Skipped picture. This means that the RAU map MI in the stream STR which is generated by the picture coding apparatus 200 indicates picture types of respective pictures including Skipped pictures, even in the simple profile and the main profile.

From the same reason, in the main profile, it is also impossible to distinguish a B-picture and a BI-picture by the picture type in the picture layer.

Therefore, the picture coding apparatus 200 according to the second embodiment generates the RAU map MI which indicates picture types of respective pictures which are included in the RAU, based on the picture types Pt which are specified by distinguishing a B-picture and a BI-picture by the prediction structure determination unit 212. This means that the RAU map MI in the stream STR which is generated by the picture coding apparatus 200 can distinguish B-pictures and BI-pictures, even in the main profile. The BI-picture, not like B-picture, can be independently decoded, so that the distinguishing of Bi-picture and B-picture increases flexibility to select pictures to be decoded and play-backed during the special play-back.

In a case a sequence layer is present, it is possible that the RAU include the sequence layer, for example, by always adding the sequence layer to the entry point layer. Further, the user data in the entry point layer may include further information besides the RAU map MI.

In the special play-back, it is important to specify a picture to be decoded and to efficiently access such picture. Therefore, the RAU map MI may indicate address information regarding each picture. Here, the address information may be information regarding a byte position counted from the beginning of the RAU or information to specify a packet in which each picture is stored when the coded data is packetized by a transport stream packet, and the like. Note that the address information may be added, not for all pictures, but only for pictures to be decoded during the special play-back, such as I-pictures or P-pictures.

<Variation>

The following describes a variation of Skipped picture according to the second embodiment.

In the second embodiment, a Skipped picture is generated to be a P-picture which has the same pixel data of the reference picture immediately prior to the Skipped picture in decoding order. Thereby, the Skipped picture cannot be used instead of a B picture.

Thus, the variation of the second embodiment generates the Skipped picture as a B-picture which is not predicted from any other pictures, and as a picture having the same pixel data as a picture that is the reference picture immediately prior to the Skipped picture in display order (hereinafter, referred to as a B-skip picture). More specifically, in the variation of the second embodiment, by newly introducing the B-skip picture, it is possible to form a GOP structure, such as I-picture, B-picture, B-picture, P-picture, B-picture, B-picture, P-picture, B-picture, B-picture, . . . , which is commonly used in the MPEG-2 standard, so that IP play-back (special play-back for play-backing only I-pictures and P-pictures) can be easily realized in the picture decoding apparatus.

Figures 18A, 18B:
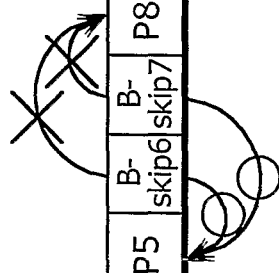
FIGS. 18A and 18B are diagrams showing a prediction structure of a B-skip picture.

FIGS. 18A and 18B show examples in which the B-skip pictures are used. Note that, in FIGS. 18A and 18B, "I", "B", "P" and "B-skip" which are included in codes "I2", "B0", "P5" and "B-skip6" and the like, represent picture types of respective pictures, and numerals which are added to the picture types indicate a display order. Note that, in FIG. 18A, the pictures in the RAU are arranged in decoding order, and in FIG. 18B, the pictures in the RAU are arranged in display order. A picture B-skip6 and a picture B-skip7 are predicted from only a picture P5 which is a reference picture immediately prior to the pictures in display order, and not predicted from a picture P8. The picture coding apparatus 200 according to the variation of the second embodiment generates a stream STR having the RAU shown in FIGS. 18A and 18B.

Here, whether or not a picture is a B-skip picture is indicated by a picture type in the RAU map MI. On the other hand, even if the picture is a B-skip picture, a picture type or a field-picture type which is included in a picture layer of the picture is a B-picture. Therefore, such a stream STR can maintain compatibility with the conventional stream, so that even the conventional decoder which cannot analyze the RAU map MI can treat the B-skip picture as a B-picture, and perform special play-back.

Note that the picture layer may indicate whether or not a picture is a B-skip picture. It is also possible to generate a B-skip picture as a picture which has the same pixel data of a reference picture immediately prior to the B-skip picture in display order. In such a case, the RAU map MI may indicate whether the B-skip picture is predicted from a reference picture immediately prior to the B-skip picture or a reference picture immediately subsequent to the B-skip picture, in display order.

Third Embodiment

Furthermore, by recording a program for realizing the picture coding apparatus and the picture decoding apparatus described in the above embodiments, on a recording medium, such as a flexible disk, it is possible to easily implement the processing described in the above embodiments by an independent computer system.

Figure 19A:
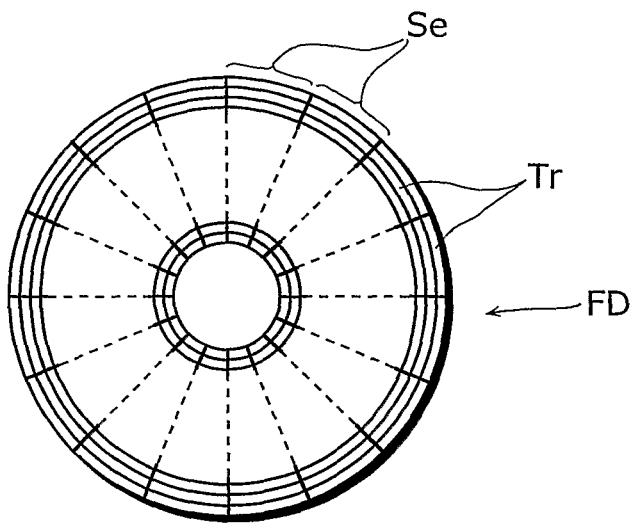
FIGS. 19A, 19B, and 19C are explanatory diagrams showing a storage medium which stores a program for realizing an image coding method and an image decoding method according to the present invention.
Figure 19B:
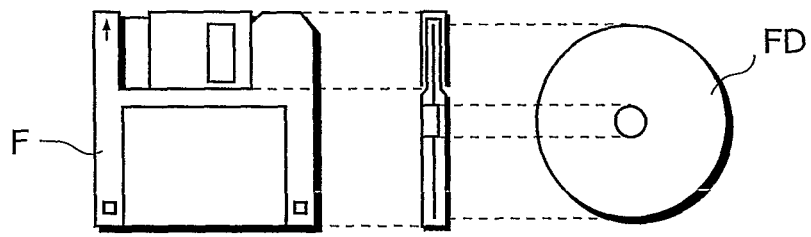
Figure 19C:
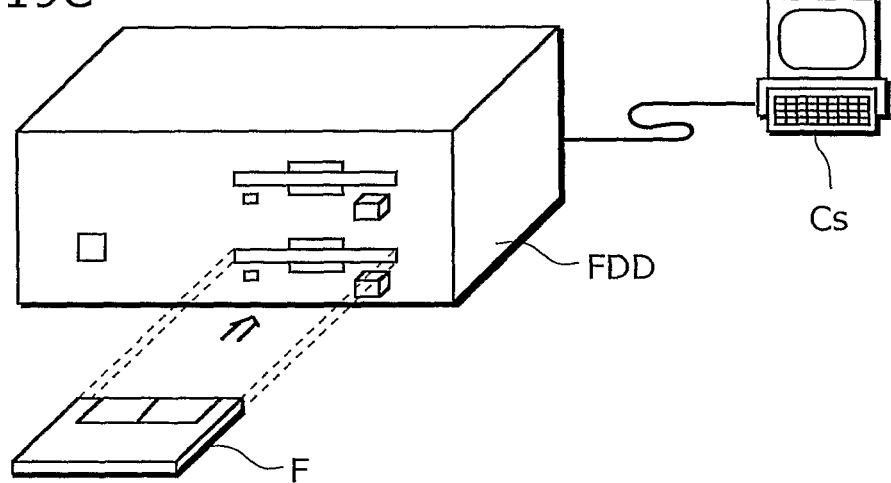

FIGS. 19A, 19B, and 19C are explanatory diagrams showing a case when the picture coding apparatus and the picture decoding apparatus described in above embodiments are realized by a computer system, by using a program which is recorded on a recording medium, such as a flexible disk.

FIG. 19B shows a front outside view of the flexible disk, a cross-sectional structure of the flexible disk, and a body of the flexible disk body. FIG. 19A shows an example of a physical format of the flexible disk body which is a main body of the recording medium. The flexible disk body FD is equipped in a case F, and a plurality of tracks Tr are formed on a surface of the disk from a circumference towards an internal circumference in a shape of concentric circles, and each track is segmented into sixteen sectors Se in an angle direction. Therefore, regarding the flexible disk storing the above program, the above program is recorded in an area allocated on the flexible disk body FD.

Furthermore, FIG. 19C shows a structure by which the flexible disk body FD records and play-backs the program. When the above program for realizing the picture coding apparatus and the picture decoding apparatus is recorded on the flexible disk body FD, the program is written from a computer system via a flexible disk drive FDD. Furthermore, when processing performed by the picture coding apparatus and the picture decoding apparatus is structured in the program system in the flexible disk, the program is read out from the flexible disk via the flexible disk drive, and transferred to the computer system Cs.

Note that the above explanation has described to use the flexible disk as a recording medium, but it is possible to use an optical disk instead. Note also that the recording medium is not limited to the above, but may be anything for enabling to record the program, such as an IC card and a ROM cassette.

As described above, according to the present invention, the picture coding apparatus adds the RAU map into a header of the RAU, and the picture decoding apparatus refers to the added RAU map before decoding each picture, so that it is possible to reduce decoding operations, and especially to improve play-back quality of a packaged media, in which a special play-back function is crucial. Therefore, the present invention has a high practical value.

As described above, the present invention has been described by using the above embodiments and the respective variations, but the present invention is not limited to the above.

For example, each functional block shown in the block diagrams (FIGS. 10 and 16, for example) is realized as a large scale integration (LSI) which is a typical integrated circuit. These functional blocks can be integrated separately, or a part or all of them may be integrated into a single chip (For example, functional blocks except a memory can be integrated as a single chip.)

The integrated circuit can be called an IC, a system LSI, a super LSI or an ultra LSI depending on their degrees of integration.

The integrated circuit technique is not limited to the LSI, and it may be implemented as a dedicated circuit or a general-purpose processor. It is also possible to use a Field Programmable Gate Array (FPGA) that can be programmed after manufacturing the LSI, or a reconfigurable processor in which connection and setting of circuit cells inside the LSI can be reconfigured.

Furthermore, if due to the progress of semiconductor technologies or their derivations, new technologies for integrated circuits appear to be replaced with the LSIs, it is, of course, possible to use such technologies to implement the enclosed functional blocks as an integrated circuit. For example, biotechnology, organic chemical technology, and the like can be applied to the above implementation.

Note that, among the functional blocks, only units for storing data to be coded or decoded is not integrated into the chip, but realized as a different function.

INDUSTRIAL APPLICABILITY

The picture coding apparatus and picture decoding apparatus according to the present invention can be applied, in play-backing the VC-1 stream and the like, to all devices which have a special play-back function, such as high-speed play-back, and is especially useful for optical disk peripheral devices in which the special play-back function is critical.

We claim:

1. A picture coding apparatus which codes pictures, comprising:
   a picture coder configured to code each picture according to a picture type of the picture;
   a first coder configured to code first supplementary information included in a random accesser including coded pictures and indicating respective picture types of the coded pictures in a decoding order of the coded pictures;
   a second coder configured to code second supplementary information included in the random accesser and indicating respective pieces of picture structure information of the coded pictures in the decoding order;
   a third coder configured to code stuffing bits in the random accesser;
   a writer configured to write, at a position prior to a starting picture in the random accesser, the first supplementary information coded by said first coder, the second supplementary information coded by said second coder, and the stuffing bits coded by said third coder;
   an audio coder configured to code audio data; and
   a multiplexer configured to multiplex coded audio data and coded information written in the random accesser, and to generate a transport stream,
   wherein the respective picture types of the coded pictures include at least an I picture on which intra-prediction coding is performed, a P picture on which inter-prediction coding is performed with reference to one picture, a B picture on which inter-prediction coding is performed with reference to two pictures, and a Skipped picture which is to be displayed with an image of a reference picture positioned immediately prior to a target picture in the coded pictures in the decoding order,
   the picture structure information of each of the coded pictures includes information indicating whether each of the coded pictures is to be displayed as a three-field image or a two-field image at a 3:2 pulldown, and
   Skipped pictures are sequentially arranged in the decoding order to form a still picture sequence.

2. A picture coding method of coding pictures, comprising:
   coding each picture according to a picture type of the picture;
   coding first supplementary information included in a random accesser including coded pictures and indicating respective picture types of the coded pictures in a decoding order of the coded pictures;
   coding second supplementary information included in the random accesser and indicating respective pieces of picture structure information of the coded pictures in the decoding order;
   coding stuffing bits in the random accesser;
   writing, at a position prior to a starting picture in the random accesser, the first supplementary information coded in said coding of the first supplementary information, the second supplementary information coded in said coding of the second supplementary information, and the stuffing bits coded in said coding of the stuffing bits;
   coding audio data; and
   multiplexing coded audio data and coded information written in the random accesser, and generating a transport stream,
   wherein the respective picture types of the coded pictures include at least an I picture on which intra-prediction coding is performed, a P picture on which inter-prediction coding is performed with reference to one picture, a B picture on which inter-prediction coding is performed with reference to two pictures, and a Skipped picture which is to be displayed with an image of a reference picture that is positioned immediately prior to a target picture in the coded pictures in the decoding order,
   the picture structure information of each of the coded pictures includes information indicating whether each of the coded pictures is to be displayed as a three-field image or a two-field image at a 3:2 pulldown, and
   Skipped pictures are sequentially arranged in the decoding order to form a still picture sequence.

3. A picture decoding apparatus, comprising:
   a receiver configured to receive a transport stream in which coded audio data and coded information written in a random accesser are multiplexed, the random accesser including coded pictures;
   a demultiplexer configured to demultiplex the transport stream, and to generate the coded audio data and the coded information written in the random accesser;
   a detector configured to detect first supplementary information, second supplementary information, and stuffing bits which are stored at a position prior to a starting picture in the random accesser;
   a selector configured to select a picture to be decoded, from the coded pictures in the random accesser, based on the first supplementary information and the second supplementary information;
   a picture decoder configured to decode the picture selected by said selector; and
   an audio decoder configured to decode the coded audio data,
   wherein the first supplementary information is included in the random accesser and indicates respective picture types of the coded pictures in a decoding order,
   the respective picture types of the coded pictures include at least an I picture on which intra-prediction coding is performed, a P picture on which inter-prediction coding is performed with reference to one picture, c) a B picture on which inter-prediction coding is performed with reference to two pictures, and a Skipped picture which is to be displayed with an image of a reference picture that is positioned immediately prior to a target picture in the coded pictures in the decoding order,
   the second supplementary information is included in the random accesser and indicates respective pieces of picture structure information of the coded pictures in the decoding order,
   the picture structure information of each of the coded pictures includes information indicating whether each of the coded pictures is to be displayed as a three-field image or a two-field image at a 3:2 pulldown, and
   Skipped pictures are sequentially arranged in the decoding order to form a still picture sequence.

4. A picture decoding method, comprising:
   receiving a transport stream in which coded audio data and coded information written in a random accesser are multiplexed, the random accesser including coded pictures;

demultiplexing the trans ort stream and generating the coded audio data and the coded information written in the random accesser;
detecting first supplementary information, second supplementary information, and stuffing bits which are stored at a position prior to a starting picture in the random accesser;
selecting a picture to be decoded, from the coded pictures in the random accesser, based on the first supplementary information and the second supplementary information;
decoding the picture selected in said selecting; and
decoding the coded audio data,
wherein the first supplementary information is included in the random accesser and indicates respective picture types of the coded pictures in a decoding order,
the respective picture types of the coded pictures include at least an I picture on which intra-prediction coding is performed, a P picture on which inter-prediction coding is performed with reference to one picture, a B picture on which inter-prediction coding is performed with reference to two pictures, and a Skipped picture which is to be displayed with an image of a reference picture that is positioned immediately prior to a target picture in the coded pictures in the decoding order,
the second supplementary information is included in the random accesser and indicates respective pieces of picture structure information of the coded pictures in the decoding order,
the picture structure information of each of the coded pictures includes information indicating whether each of the coded pictures is to be displayed as a three-field image or a two-field image at a 3:2 pulldown, and
Skipped pictures are sequentially arranged in the decoding order to form a still picture sequence.

5. A method of recording a coded stream onto a recording medium, comprising:
coding each picture according to a picture type of the picture;
coding first supplementary information included in a random accesser including coded pictures and indicating respective picture types of the coded pictures in a decoding order of the coded pictures;
coding second supplementary information included in the random accesser and indicating respective pieces of picture structure information of the coded pictures in the decoding order;
coding stuffing bits in the random accesser;
writing the first supplementary information coded in said coding of the first supplementary information, the second supplementary information coded in said coding of the second supplementary information, and the stuffing bits coded in said coding of the stuffing bits, at a position prior to a starting picture in the random accesser;
coding audio data;
multiplexing coded audio data and coded information written in the random accesser, and generating a transport stream; and
recording the transport stream onto the recording medium,
wherein the respective picture types of the coded pictures include at least an I picture on which intra-prediction coding is performed, a P picture on which inter-prediction coding is performed with reference to one picture, a B picture on which inter-prediction coding is performed with reference to two pictures, and a Skipped picture which is to be displayed with an image of a reference picture that is positioned immediately prior to a target picture in the coded pictures in the decoding order,
the picture structure information of each of the coded pictures includes information indicating whether each of the coded pictures is to be displayed as a three-field image or a two-field image at a 3:2 pulldown, and
Skipped pictures are sequentially arranged in the decoding order to form a still picture sequence.

* * * * *